US006649848B2

United States Patent
Kriger

(10) Patent No.: US 6,649,848 B2
(45) Date of Patent: Nov. 18, 2003

(54) VEHICLE WITH ON-BOARD DIETERS' WEIGHT PROGRESS INDENTIFYING AND CONTROL SYSTEM AND METHOD

(76) Inventor: Yefim G. Kriger, 445 Beaver St., #A10, Ansonia, CT (US) 06401

( * ) Notice: Subject to any disclaimer, the term of this patent is extended or adjusted under 35 U.S.C. 154(b) by 156 days.

(21) Appl. No.: 09/945,781

(22) Filed: Sep. 4, 2001

(65) Prior Publication Data

US 2003/0042051 A1 Mar. 6, 2003

(51) Int. Cl.7 .............................................. G01G 19/40
(52) U.S. Cl. .............................. 177/25.13; 177/25.16; 177/136; 177/25.19; 177/144; 128/921; 180/313
(58) Field of Search ........................ 177/25.16, 136, 177/144, 210 R, 25.11, 25.12, 25.13, 25.14, 25.15, 25.19; 128/921; 180/313

(56) References Cited

U.S. PATENT DOCUMENTS

| 4,030,559 A | 6/1977 | Fish ............................ 177/159 |
| 4,318,447 A | 3/1982 | Northcutt .................. 177/25.19 |
| 4,423,792 A | 1/1984 | Cowan ....................... 177/25.19 |
| 4,576,244 A | 3/1986 | Zeigner et al. ............. 177/245 |
| 4,577,710 A * | 3/1986 | Ruzumna ................... 177/25.19 |
| 4,844,187 A * | 7/1989 | Jabero ........................ 177/25.19 |
| 5,232,243 A * | 8/1993 | Blackburn et al. ........... 177/144 |
| 5,412,564 A | 5/1995 | Ecer ............................. 600/300 |
| 5,573,269 A * | 11/1996 | Gentry et al. ................ 177/144 |
| 5,673,691 A | 10/1997 | Abrams ....................... 128/921 |
| 5,704,350 A | 1/1998 | Williams, III ............... 128/630 |
| 5,747,745 A | 5/1998 | Neuman ...................... 177/132 |
| 6,069,325 A | 5/2000 | Aoki ........................... 177/136 |
| 6,092,838 A | 7/2000 | Walker ........................ 177/144 |
| 6,093,895 A | 7/2000 | Niosi ........................... 177/136 |
| 6,348,663 B1 * | 2/2002 | Schoos et al. ............... 177/144 |

OTHER PUBLICATIONS

"The Best From Abroad (Norway)" cartoon from the *Washington Daily News*, Jun. 13, 1961.*

* cited by examiner

*Primary Examiner*—Randy Gibson
(74) *Attorney, Agent, or Firm*—Herbert Dubno

(57) ABSTRACT

A motor vehicle is provided with a weight control system utilizing the on-board weighing of the driver and one or more passengers. The display and input are effected through a touch screen and/or voice commands and the individuals's identification is registered in memory as are previous weighing states so that with control progress can be monitored. To compensate for different clothing and footwear which might contribute to false reading, the system dialogues with the individual with respect to clothing and footwear.

16 Claims, 23 Drawing Sheets

Fig.14

VEHICLE WITH ON-BOARD DIETERS' WEIGHT PROGRESS INDENTIFYING AND CONTROL SYSTEM AND METHOD

FIELD OF THE INVENTION

The present invention relates to a vehicle having an on-board vehicle driver dieter's and passenger-dieter's weight progress control method and system that manages the measurements of the dieter's weight during a trip and provides dieting information to conserve the time of the user.

BACKGROUND OF THE INVENTION

There are a number of weight control systems and methods. Many weight control plans are available to individual users from which the user can select a particular program designed to control the weight of that individual and, associated with such programs are programs involving exercise and like physical activities.

Many different kinds of electrical scales have also been suggested for diet and weight control plans. For example, U.S. Pat. No. 4,318,447 entitled "Diet Scale with Weight Progress Indicator" issued to Northcutt in 1982, discloses a diet scale with a digital readout and microcomputer that is used to enable a dieter to enter a diet program having an objective weight and a given time interval. In U.S. Pat. No. 4,423,792 entitled "Electronic Scale Apparatus and Method of Controlling Weight" issued to Cowan in 1984, discloses an apparatus that includes an electronic circuit in which the weight of the individual at the selected point in time can be compared against the base weight. The U.S. Pat. No. 4,576,244 entitled "Dieter's Weighing Scale" issued to Zeigner et al in 1986, discloses a talking electronic scale with microprocessor that compares the goal weight with the present weight to actuate a voice synthesis device to provide preselected comments appropriate to the comparison.

Selecting food and counting the consumption of food calories is a common function of many weight control systems. For example, U.S. Pat. No. 5,704,350 entitled "Nutritional Microprocessor and Method" issued to Williams in 1998, discloses a microcomputer and method for selecting food, nutrients, vitamins, and physical activities from different databases and compares the user's daily dietary and physical activities to the user's recommended dietary allowance. In U.S. Pat. No. 5,412,564 entitled "System and Method for Diet Control" issued to Ecer in 1995, there is disclosed a diet control system that employs "smart cards" having memory and microprocessor for writing information at a food store or a restaurant check-out counter for collecting electronically the dietary nutritional consumption. In U.S. Pat. No. 5,673,691 entitled "Apparatus to Control Diet and Weight Using Human Behavior Modification Techniques" issued to Abrams et al in 1997, there is disclosed a hand-held computer which prepares and monitors a goal-oriented weight, nutrition, and exercise control program. In Abrams et al the preferred embodiment can be applied to manage a low cholesterol diet, a diabetic's diet, and a hypertension control diet. Abrams et al suggest that the disclosed embodiment must be redesigned in each case if different diet plans are to control.

All the above described patents require the dieter to have the scale on the floor at home and have the same weighing procedure. Thus the dieter has to find time to step up on the scale. As a result, the described patents do not help a dieter who is busy and highly active to choose a diet and lose weight and keep health in a good condition. These activities often depend on a mood, physical state, and free time of the individual. As a result, individual very often does not obey the requirements of the lose weight program and exercise plans on time or does not accomplish them.

The U.S. Pat. No. 4,030,559 entitled "Portable Weighing Scale" issued to Fish et al in 1977, discloses a weighing scale of reduced size to permit the weighing of an individual while standing with one foot on the platform of the scale. This kind of scale helps a dieter a little bit to work with the diet plan because it shortens the time and reduces the facilities for the weight measurement.

Furthermore, many people travel much by the car. They are often on a business trip or are driving during holidays, vacations, or weekends. It is very hard for them to check and control their weight during that period of time.

One more shortcoming of the Abrams et al and the other described systems is that the computer is programmed with only a sample of selectable menu choices, but not rather with the different diet plans themselves. Thus the dieter often cannot select a diet plan which then will be followed to generate the choices very fast.

OBJECTS OF THE INVENTION

It is the principal object of the present invention to expand the utility of a motor vehicle, especially a passenger vehicle such as an automobile, a van and even a boat, so that the time spent in the vehicle can be utilized more efficiently and the interaction of the vehicle with the driver and/or passenger can be improved.

It is another object of the invention to provide an improved weight progress identifying and control system which can utilize time of a dieter which is often wasted and which can reliably assist in weight control and monitoring without requiring the dieter to set aside specific times for that purpose or to travel to a specific location as a precondition for such monitoring.

A further object of the invention is to provide an improved method of weight control which avoids drawbacks of earlier methods and which can be practiced more conveniently than earlier methods.

SUMMARY OF THE INVENTION

These objects and others which will become apparent hereinafter are attained, in accordance with the invention, in an automotive vehicle equipped to provide an automatic weighing of the driver and/or passenger and provided with the ability to monitor that weight, manage a weight control program, and provide whatever information may be required for the dieter in that regard. The invention utilizes computer facilities which can normally be present in a modern automotive vehicle and is enhanced by a touch screen input device which allows dialoging between the on-board computer and the driver and/or passenger.

While the preferred weighing device for the driver or a passenger is the weight-responsive unit used to control operation of an air bag, it can be a unit which is separate from the air bag control system. It may, for example, be a floor unit which is engaged by the user with only one foot.

Prior to the present invention, there was no the on-board vehicle weight progress control method and system that could identify and monitor weight progress of a driver dieter and passenger dieters to establish weight goals for each dieter in a vehicle.

The present invention provides an on-board vehicle weight progress control system (BOVECS) that identifies the weight progress of a dieter in the vehicle independently from the seasonal changes of the clothing and/or footwear of the dieter by a weight identifier.

The on-board vehicle weight progress control system manages measurement of the dieter's weight during a time when he or she is in the vehicle seat during a trip and does not waste extra time for this procedure and cannot forget about and miss the weight measurement. That makes the BOVECS more reliable than other weight management systems.

The present invention provides a safety service for the driver dieter by the use of an algorithm of availability during a trip and a traffic recognition routine.

The on-board system of the present invention is thus a more reliable weight progress control system and method that will help the driver dieter to shorten the time and attention of the dieter's activities to lose weight and manages health in a good condition.

The present invention is the on-board vehicle weight progress identifying and control system that allows the driver-dieter to choose a diet plan and exercises from the plurality of the diet plans and exercises in the memory of the on-board vehicle microcomputer.

The on-board vehicle microcomputer is coupled to an microcomputer controlled driver weighing device upon which the driver-dieter is weighed. As a driver weighing device, the system disclosed in U.S. Pat. No. 6,092,838 entitled "System and Method for Determining the Weight of a Person in a Seat in a Vehicle" issued to Walker in 2000, may be used. This system detects the weight of a person seated in a vehicle seat and sends a signal to the air bag actuation controller if the output voltage of the operational amplifier is greater than the predefined level. The other device that may be used for the same purposes is a system disclosed in U.S. Pat. No. 6,069,325 entitled "Seat Weight Measuring Apparatus" issued to Aoki in 2000, where a seat weight measuring apparatus measures a seat weight including a weight of a passenger sitting on an automotive seat.

The microcomputer controlled driver weighing device provides a direct input to the on-board vehicle microcomputer of the weight of that driver-dieter at the time driver-dieter is in the vehicle, which weight is used as an input variable to cause the vehicle microcomputer, based upon the driver-dieter selection of a particular weight control plan or program, to generate menu information and exercise information to permit maintenance of a particular program of weight control, whether that program involves weight loss or weight maintenance.

The present invention allows the passenger dieter also to choose a diet plan and exercises from the plurality of the diet plans and exercises in the memory of the on-board vehicle microcomputer, and on-board vehicle weight progress identifying and control system weighs the passenger dieter when he or she is in the vehicle during a trip.

The on-board vehicle weight progress control system provides identification of the real weight of the driver-dieter and progress control system provides identification of the real weight of the driver-dieter and passenger-dieter by monitoring weight of the driver-dieter and passenger-dieter and excluding extreme changes in the weight graph upon the seasonal changes of the driver-dieter's or passenger-dieter's clothing and/or footwear.

For the correlating weights of driver dieters of different age, gender, and physical types with respective weight-control diet plans, recommendations of the book Bowes and Church's *Food Values of Portions Commonly Used* 15$^{th}$ edition revised by Jean A. T. Pennington, Ph.D., R. D. Harper & Row, Publishers, New York, 1989, can be employed.

According to a feature of the invention, the on-board vehicle microcomputer stores menu items of a plurality of diet plans (vegetarian, by age, religion, number of calories, country, illness, fast diets, etc.) and utilizing the touch screen of the on-board vehicle microcomputer, the driver dieter or passenger dieter can select the menu item information of one of these diet plans for outputting to the touch screen. This procedure using classified diet plans simplifies the employing of the on-board weight progress control system.

According to another feature of the invention, codes can be stored in the on-board vehicle microcomputer representing a plurality of the driver dieters and passenger dieters that are likely to travel in the vehicle. These can be members of the vehicle owner's family and, again, utilizing the touch screen, the current driver dieter or passenger dieter can input the code representing that driver dieter or passenger dieter for comparison with a stored code which will identify the driver dieter or passenger dieter whose weight is being inputted through the weighing device.

Previous weights can be memorized by the on-board vehicle microcomputer and each new weight can be compared with previously memorized weights and the menu item information and the exercise information can be automatically generated by the comparison of the new weight of the current driver dieter or passenger-dieter with the previously memorized weights.

When a number of successive weights are memorized, a graph of weights of the driver dieter or passenger dieter can be displayed over a period of time and if desired, the on-board vehicle microcomputer can be programmed to extrapolate to some future date a weight control pattern.

The automatic estimation of the future weight pattern can be based upon the assumption of ingestion of the displayed menu items.

The display of a future weight pattern can also be based upon following by the driver dieter or passenger dieter to displayed exercise information.

An important feature of the invention is that the driver dieter or passenger dieter may establish his or her weight control plan by using a fitness status screen.

BRIEF DESCRIPTION OF THE DRAWING

The above and other objects, features, and advantages will become more readily apparent from the following description, reference being made to the accompanying drawing in which:

FIG. 14 is a display of the Number Entry pop-up window;

DETAILED DESCRIPTION OF THE DRAWINGS

Figure 1:
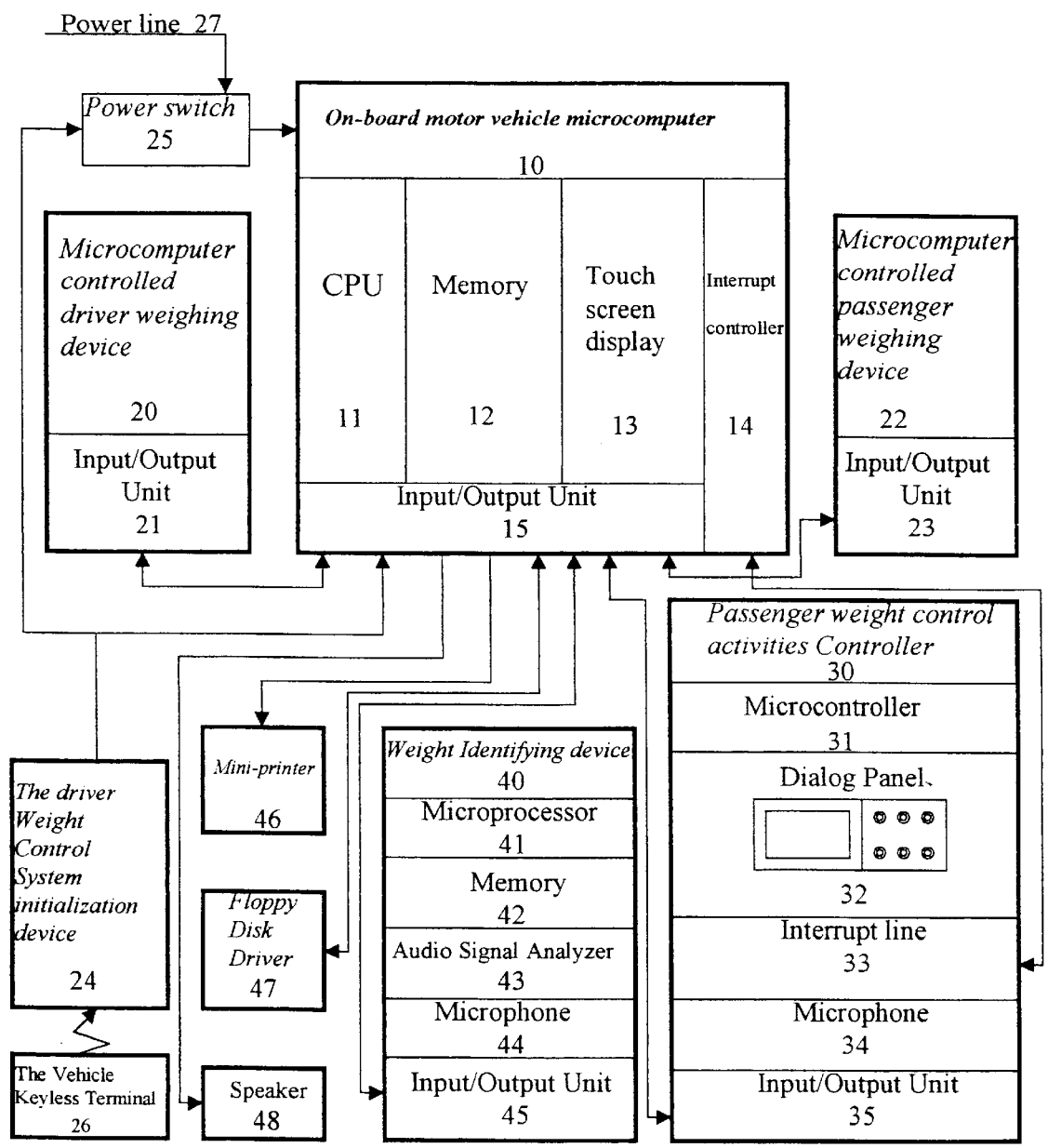
FIG. 1 is a block diagram of the devices that comprise the on-board vehicle weight control system.

FIG. 1 is a block diagram of the on-board motor vehicle weight control system. The system consists of six main devices: on-board motor vehicle microcomputer 10, microcomputer controlled driver weighing device 20, microcomputer controlled passenger weighing device 22, the driver weight control system initialization device 24, passenger weight control activities controller 30, and weight identifying device 40. Central processing unit (CPU) 11 of the microcomputer 10 controls all devices of the system by use of a memory 12 and corresponding interfaces that are provided by the input/output unit 15. This description assumes the use of a touch screen type of a display-input unit 13 that is included in microcomputer 10. An interrupt controller 14 provides monitoring the passenger weight control activities.

The on-board microcomputer can use the microcomputer or microprocessor systems currently used in motor vehicles for engine and status control and the touch screen output-input unit may be positioned in the dashboard, on the roof of the vehicle or wherever else may be convenient to the driver sitting in the driver's seat. It can be so positioned that it is not visible to passengers and, as will be apparent hereinafter, can be one of a number of such touch screens positioned so that they can display to and be engaged by the passengers. Other kinds of inputs and outputs can be provided, of course, although they are less convenient. Voice operated systems may also be used and a wired or wireless connection can be available to allow a laptop or palm unit to be connected to the microcomputer for transfer of data therebetween.

Figure 3:
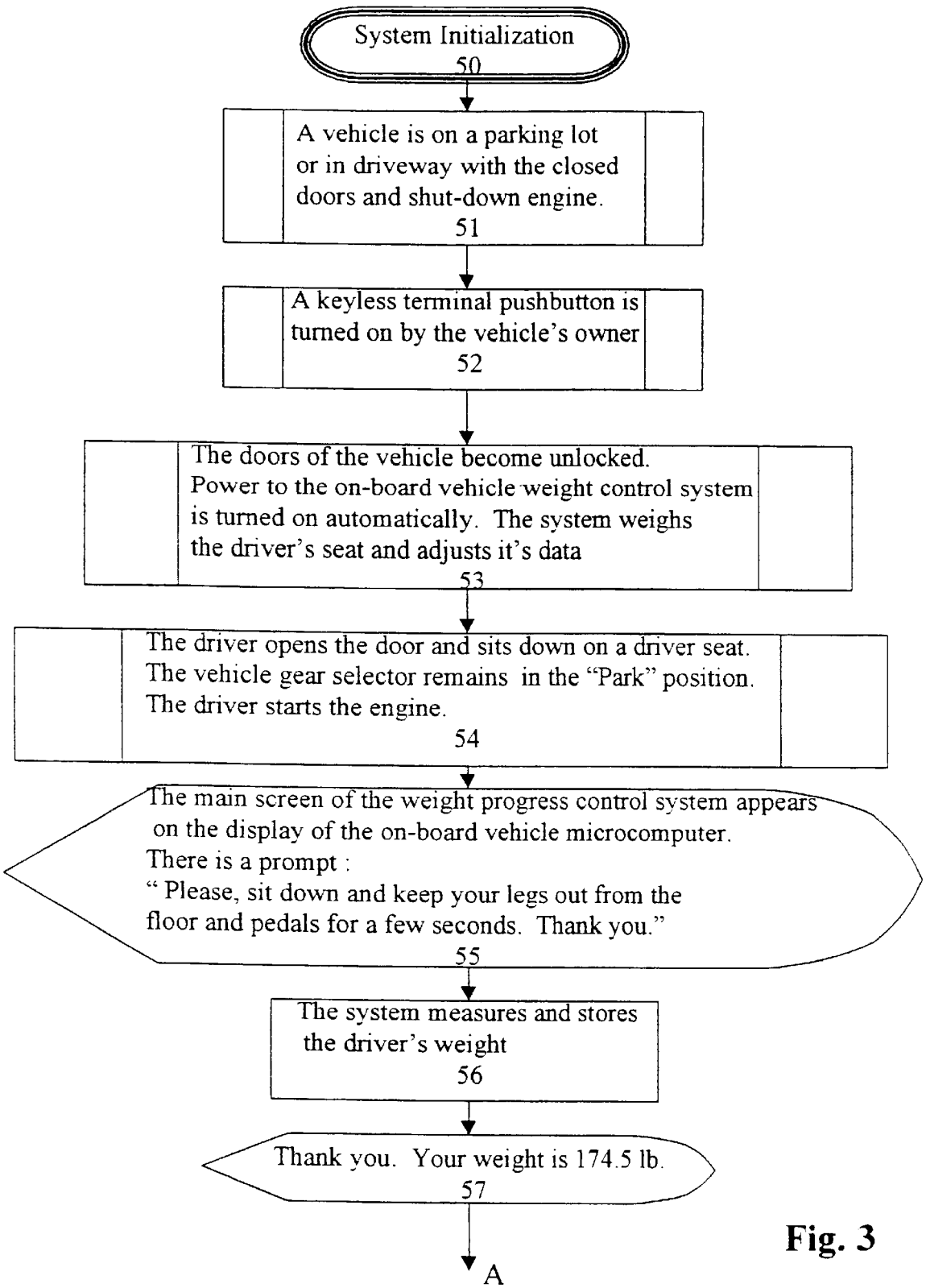
FIG. 3 is a flowchart for the System Initialization routine.

The system starts to work as the vehicle's owner pushes a button of the vehicle keyless terminal 26 outside of the vehicle. At that moment, the driver weight control system initialization device 24 sends an initialization signal to both the switch 25 of the power line 27 and the input/output unit 15 of the microcomputer 10. Microcomputer 10 starts its System Initialization routine 50 from step 53 (FIG. 3). The description of the microcomputer controlled driver weighing device 20 with input/output unit 21 and System Initialization routine 50 is given for a driver seat employing as a driver weighing device. In case of an electrical scale embedded in the vehicle is used as a driver weighing device 20 with the input/output unit 21 included, microcomputer 10 controls the power line, "zero" adjustment, and possibly other parameters of the electrical scale such as a transfer rate, number of bits in the data word, number of stop bits, and parity. A more detailed description of the software routines to serve a driver as a dieter is given below.

Passenger weight control activities controller 30 is destined to serve a passenger as a dieter by use of a microcomputer controlled passenger weighing device 22. Passenger weight control activities controller 30 includes a microcontroller 31 that provides all control and processing operations by use of its own memory, and a dialog panel 32 with touch screen and push buttons. Input/output unit 35 provides an interface with the microcomputer 10. The passenger starts the weight control activities and Passenger Weight Control Activities routine 150 (FIG. 13) of the microcomputer 10 by pushing a button that activates an interrupt line 33 that is connected to the interrupt controller 14 of the microcomputer 10. The description of the microcomputer controlled passenger weighing device 22 with input/output unit 23 and Passenger Weight Control Activities routine 150 is given for a passenger seat employed as a passenger weighing device.

In case of an electrical scale embedded in the vehicle is used as a passenger weighing device 22 with the input/output unit 23 included, microcomputer 10 controls the power line, zero adjustment, and possibly other parameters of the electrical scale such as transfer rate, number of bits in the word, number of stop bits, and parity.

When microcomputer 10 starts to run the Passenger Weight Control Activities routine 150, the passenger weight control activities controller 30 makes the interrupt line 33 passive. A more detailed description of the software routines to serve a passenger as a dieter is given below.

The on-board vehicle weight control system is distinguished from weight control systems because of the possibly different clothing and footwear of the driver and/or passenger at the moment of the different measurements of their weights during the current day or during several consecutive days.

Figure 6:
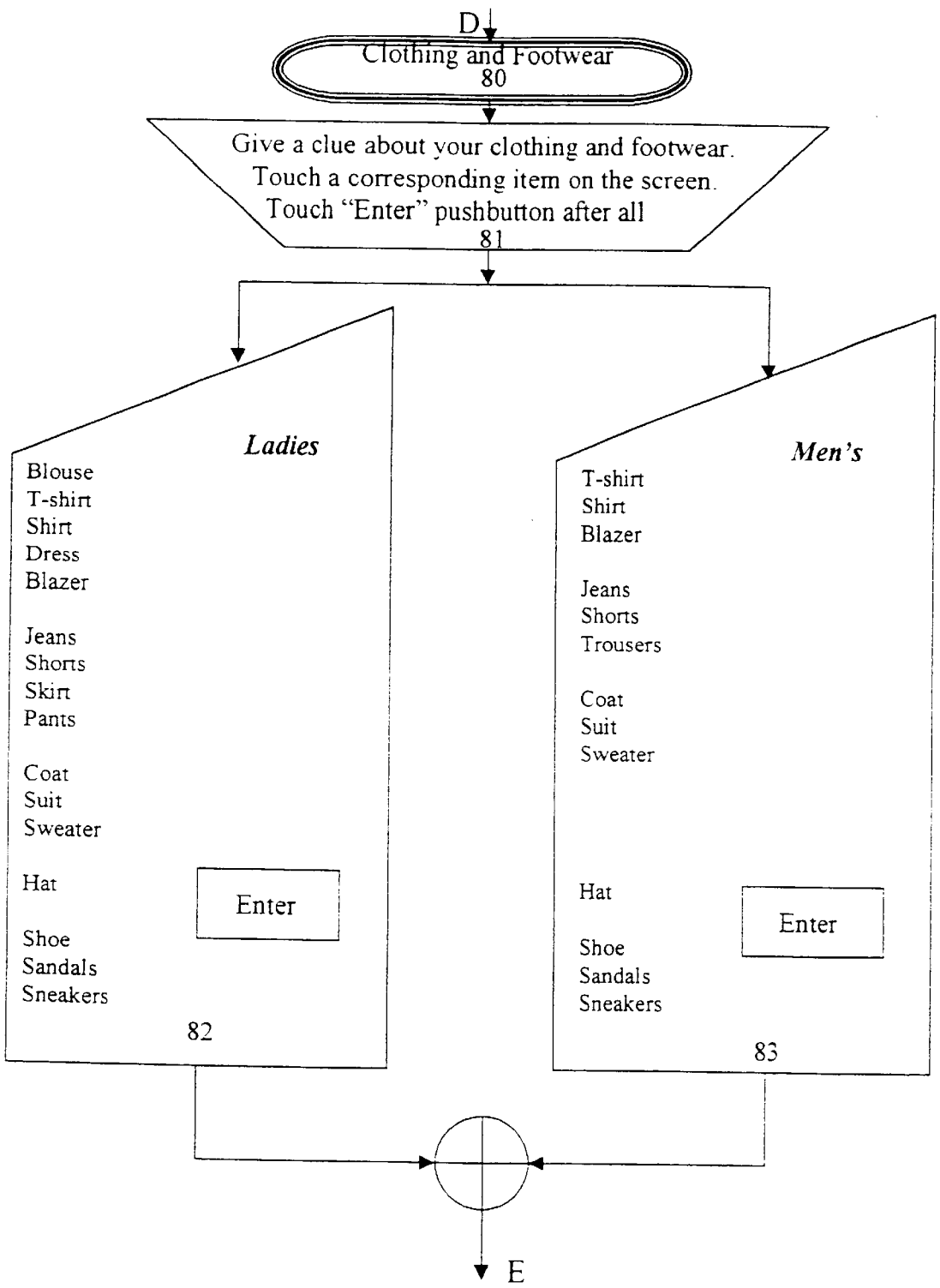
FIG. 6 is a flowchart for the Clothing and Footwear routine.
Figure 7:
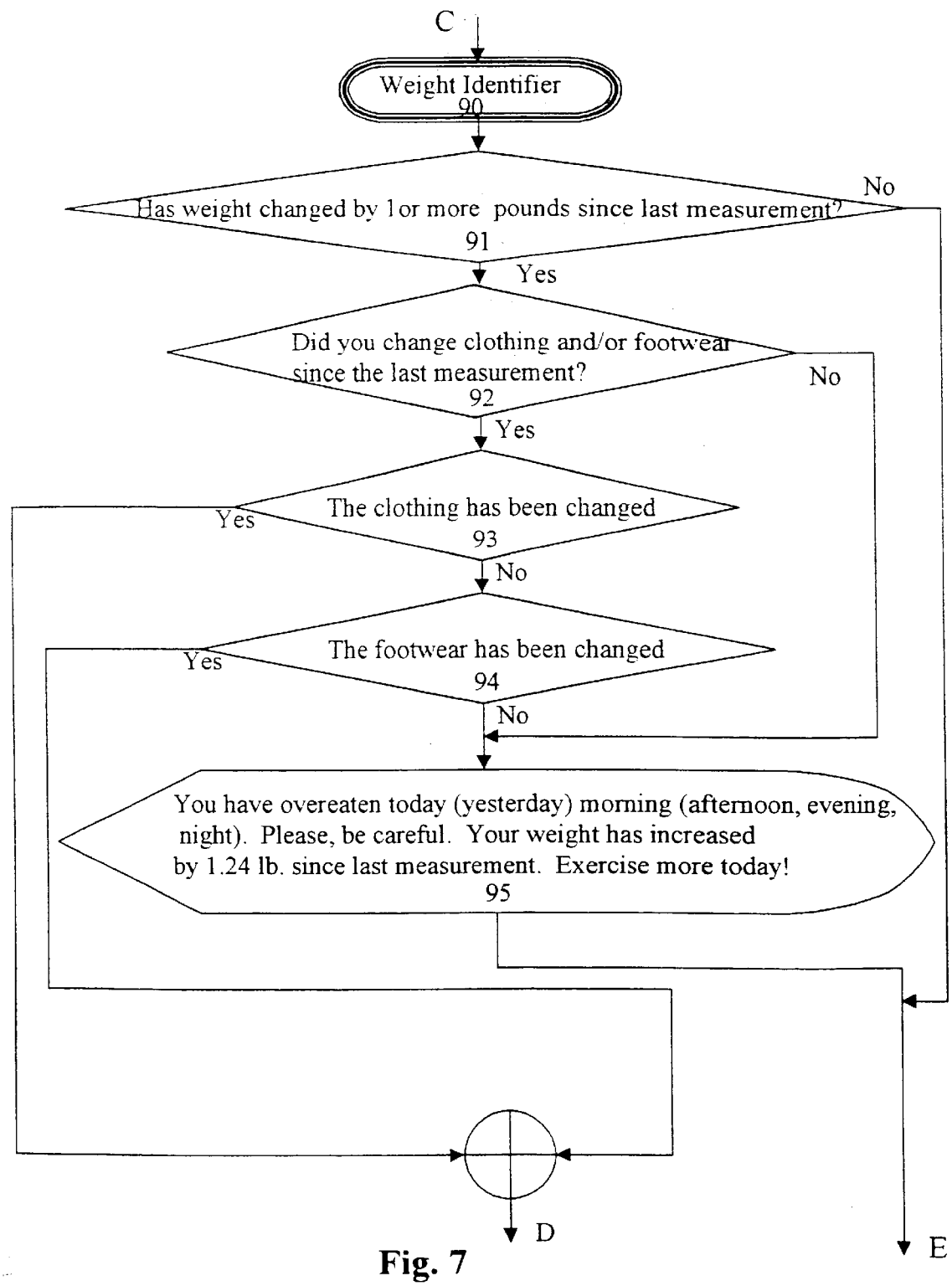
FIG. 7 is a flowchart for the Weight Identifier routine.

There are two software routines that decrease any errors because of different clothing and footwear at the different weight measurements: Clothing and Footwear routine 80 (FIG. 6) and Weight Identifier routine 90 (FIG. 7).

During an execution of these two routines there is a dialog between an on-board vehicle weight control system and driver and/or passenger that recognizes any changes in the clothing and/or footwear at the time between the two consecutive weight measurements. It is necessary to realize what clothing and/or footwear have been changed if any to decrease the error in the weight measurement. The weight identifying device 40, microphones 34 and 44 incorporated into the passenger weight control activities controller 30 and weight identifying device 40 accordingly, and speaker 48 enable the dialogs between system and driver and/or passenger to be audio dialogs. The driver and/or passenger can answer just "yes" or "no" during these audio dialogs without touching the touch screen. An audio dialog makes the driver and passenger feel more comfortable.

The weight identifying device 40 consists of microprocessor 41 and memory 42 that provide resources for recognizing the audio signals by use an audio signal analyzer 43. The input/output unit 45 provides an interface to the microcomputer 10.

There are two peripheral devices in the system. Miniprinter 46 responds to the Shopping List routine 120 (FIG.

10) to print a weekly shopping list out. Floppy disk driver 47 is employed to input to and save data from the on-board motor vehicle weight control system.

Figure 2:
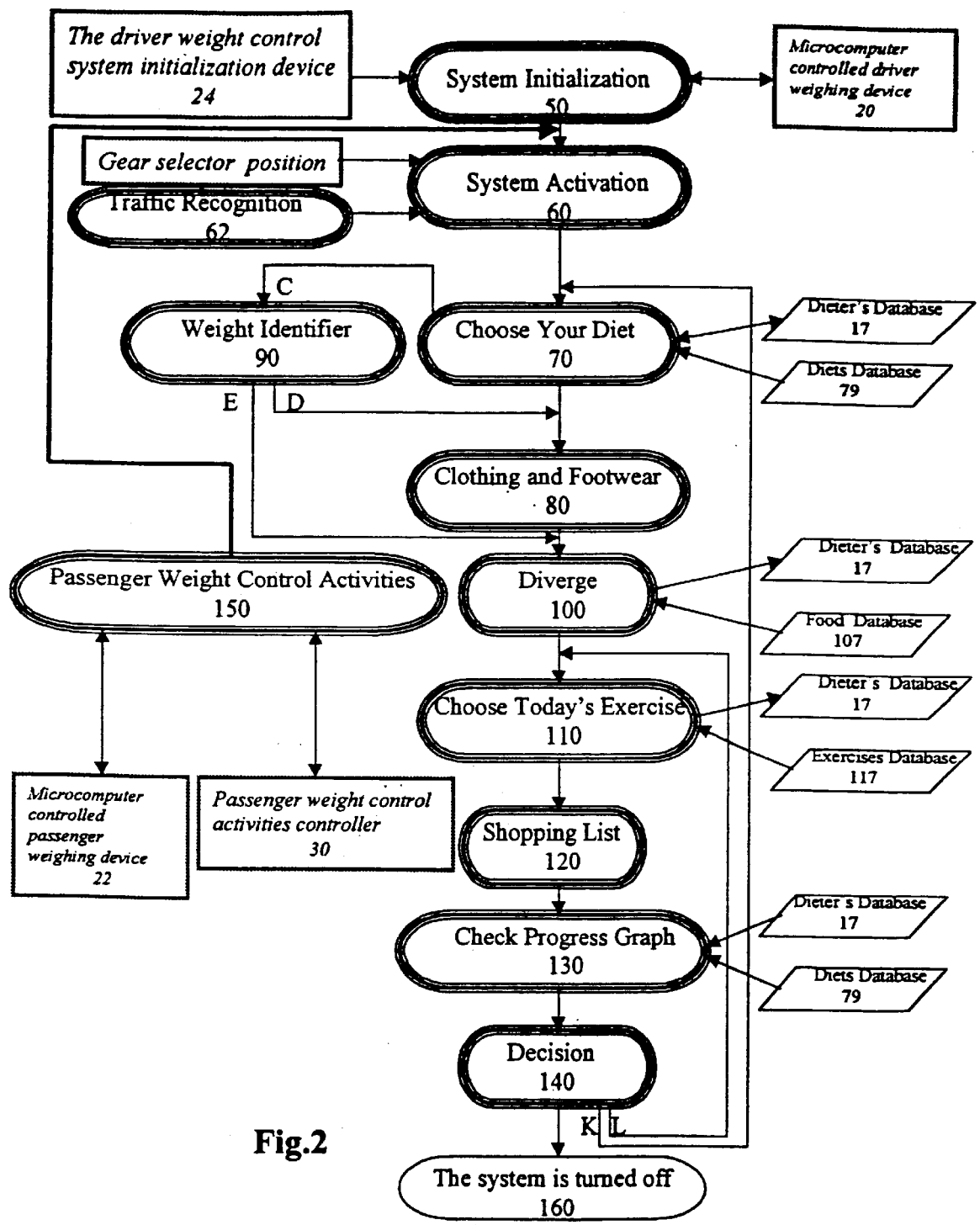
FIG. 2 is a block diagram of the interconnection of the software routines with the hardware and databases.

FIG. 2 is a block diagram relating the software routines to the units of the on-board motor vehicle weight control system.

When the vehicle's owner pushes a button of the vehicle keyless terminal outside of the vehicle, the driver weight control system initialization device 24 sends an initialization signal to the microcomputer 10 that starts its System Initialization routine 50 (FIG. 3), which controls the power, transfer parameters, and "zero" correlating process of the microcomputer controlled driver weighing device 20. When the driver sits down on the driver seat, the system measures his or her weight, and the System Activation routine 60 (FIG. 4) starts and defines whether the system may be activated because the vehicle is in a safe driving mode. This routine gets information from gear selector position (when the selector in the Park" position) and from the Traffic Recognition routine 62 (when there is difficult traffic).

If the system is activated, the Choose Your Diet routine 70 (FIG. 5) starts. The driver or passenger inputs his or her name and password into the system. If the driver or passenger is a new dieter, he or she gets recommendations from the "Fitness status" screen and chooses a diet plan from the plurality of diet plans that are in the Diets Database 79 (FIG. 2). The personal driver or passenger data will be memorized in the Dieter's Database 17 (FIG. 2).

A Clothing and Footwear 80 (FIG. 6) routine then starts. If the driver or passenger is not a new user, Weight Identifier routine 90 (FIG. 7) starts. The system recognizes if the weight of the dieter has changed by one or more pounds since last measurement. If any, the system defines the reason of this change of the dieter's weight by the dialog between system and dieter. If the weight has changed because of the clothing or footwear change, the Clothing and Footwear routine 80 starts. This routine memorizes the clothing and footwear of the new user and recognizes and memorizes any changes in clothing and/or footwear if any by the dialog with the dieter.

The Diverge routine 100 (FIG. 8) memorizes in the Dieter's Database food that dieter excluded or added to his/her diet plan by use of the Food Database 107 (FIG. 2) and information as to food items inputted by the dieter.

Figure 9:
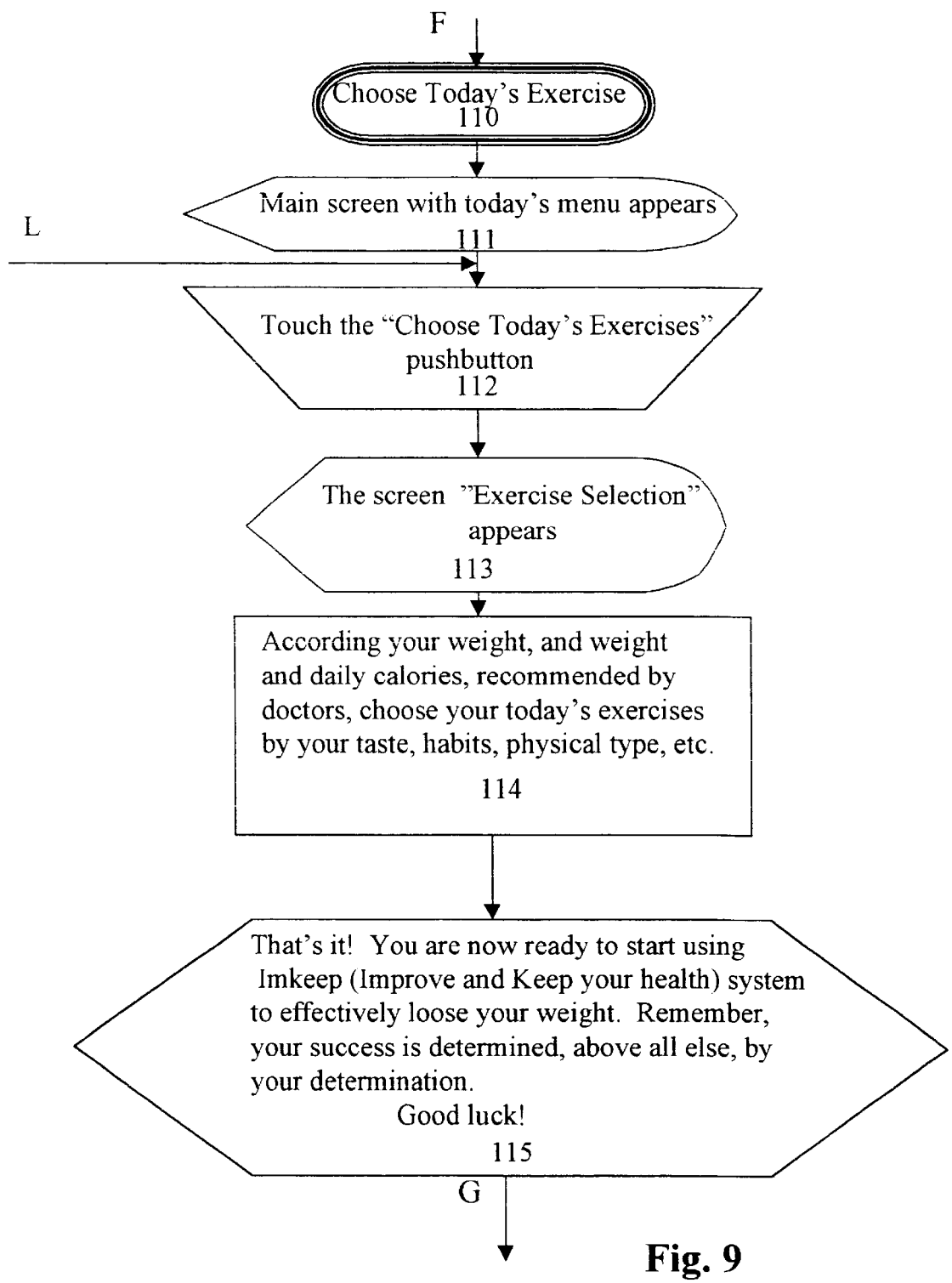
FIG. 9 is a flowchart for the Choose Today's Exercise routine.

In Choose Today's Exercise routine 110 (FIG. 9) the dieter uses the value of his or her extra pounds (calories) to be burned calculated by the system to choose today's exercises from the Exercise Database 117 (FIG. 2). The system memorizes this data in the Dieter's Database.

Figure 5:
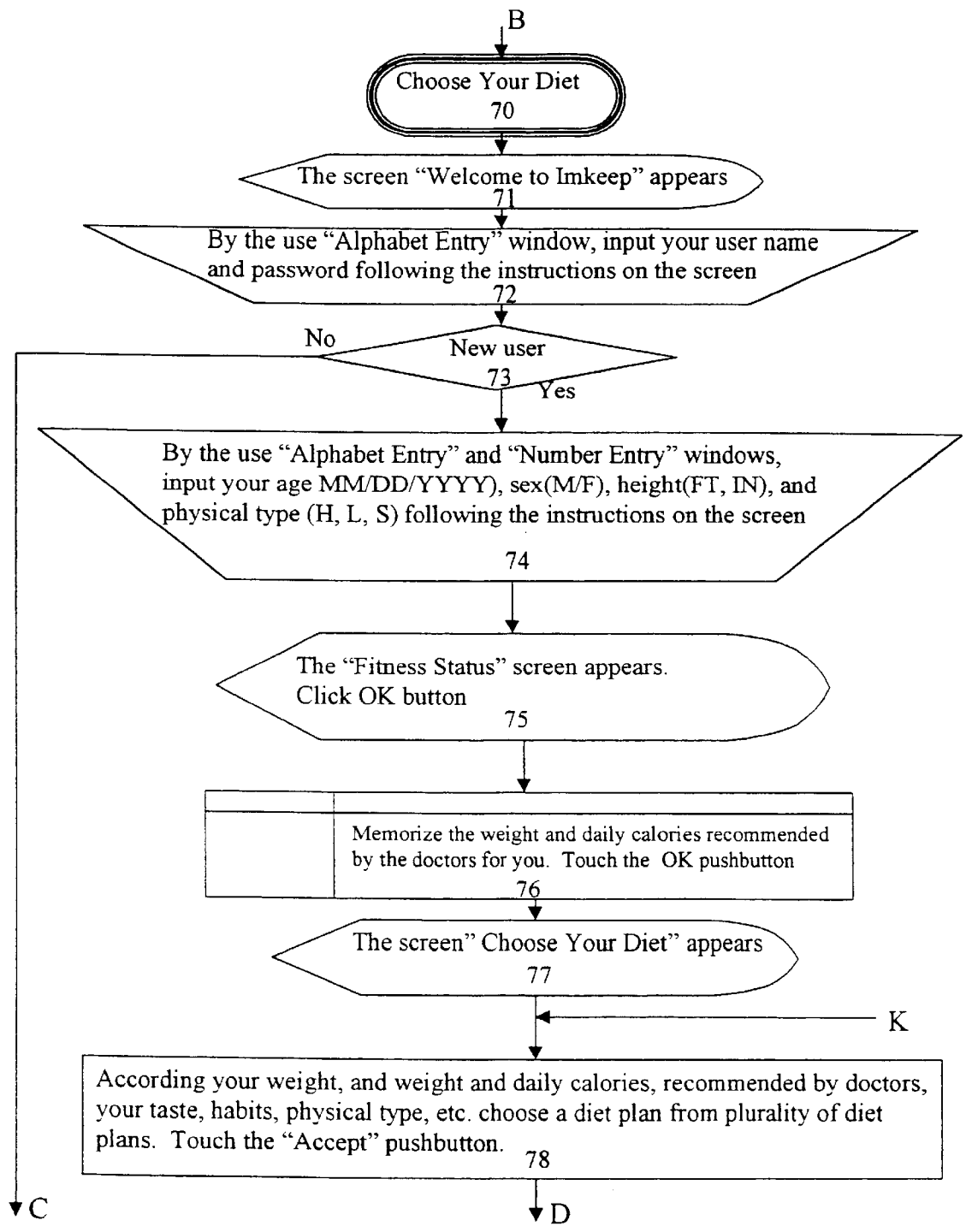
FIG. 5 is a flowchart for the Choose Your Diet routine.

The Shopping List routine 120 (FIG. 10) gives an opportunity to save or print the weekly shopping list for the dieter. The dieter can analyze the result of use of the chosen diet plan by the Check Progress Graph routine 130 (FIG. 11) that employs the Diets Database 79 and Dieter's Database 17. The Decision routine 140 (FIG. 12) shows the activities of the dieter to be assure that his or her progress with the chosen diet and exercises plans is good. The flowchart shows, that in case the dieter wants to change the diet plan it is necessary to go to Choose Your Diet routine 70 (FIG. 5). It is necessary to go to Choose Today's Exercise routine 110 (FIG. 9) to change the activities.

The Passenger Weight Control Activities routine 150 (FIG. 13) starts when the passenger activates the interrupt line 33 of the passenger weight control activities controller 30. The system then weighs the passenger if it is not busy (does not serve for the driver that moment), memorizes passenger's weight, and checks if the system is activated for the dialog with the passenger.

FIG. 3 shows the flowchart for the System Initialization routine 50. If a vehicle is on a parking lot or in driveway with the closed doors and shut-down engine 51, the on-board vehicle weight progress control system is passive. When the owner of the vehicle turns on the vehicle at 52 via, for example a pushbutton of the vehicle keyless terminal outside of the vehicle, the power to the on-board weight progress control system is turned on automatically. The system weighs the driver's seat 53 and memorizes its value to calculate the weight of the driver that will be weighed together with the driver seat in the future. When the driver opens a door of the vehicle and sits down on a driver seat and a vehicle gear selector remains in the "Park" position 54, the main menu of the on-board weight progress control system appears on the touch screen of the on-board microcomputer. There is a prompt on the screen such as "Please, seat down and keep your legs out from the floor and pedals for a few seconds. We will get your weight. Thank you." 55. The system measures the driver's weight together with the seat and calculates the driver's weight 56 by use the data gotten at 53 and shows the weight of the driver on the touch screen 57. After the weight of the driver has been gotten, the system checks the conditions for an activation for a dialog with the driver. According the safety requirements of the invention, the driver is not allowed to have a dialog with the system if:

1. The gear selector is not in the "Park" position,

Or

2. There is not a situation of "Hard traffic."

"Hard traffic" is defined, for the purposes of the invention, as traffic in which the vehicle is moving at 10 mph or less. At speeds above this, operation of the system may endanger the user or other vehicle operators. At speeds of 10 mph or below, it is presumed that the driver can give attention to the weight-control system as may be required without a hazard. Of course other limitations as to when the system can be operational may also be imposed.

Figure 16:
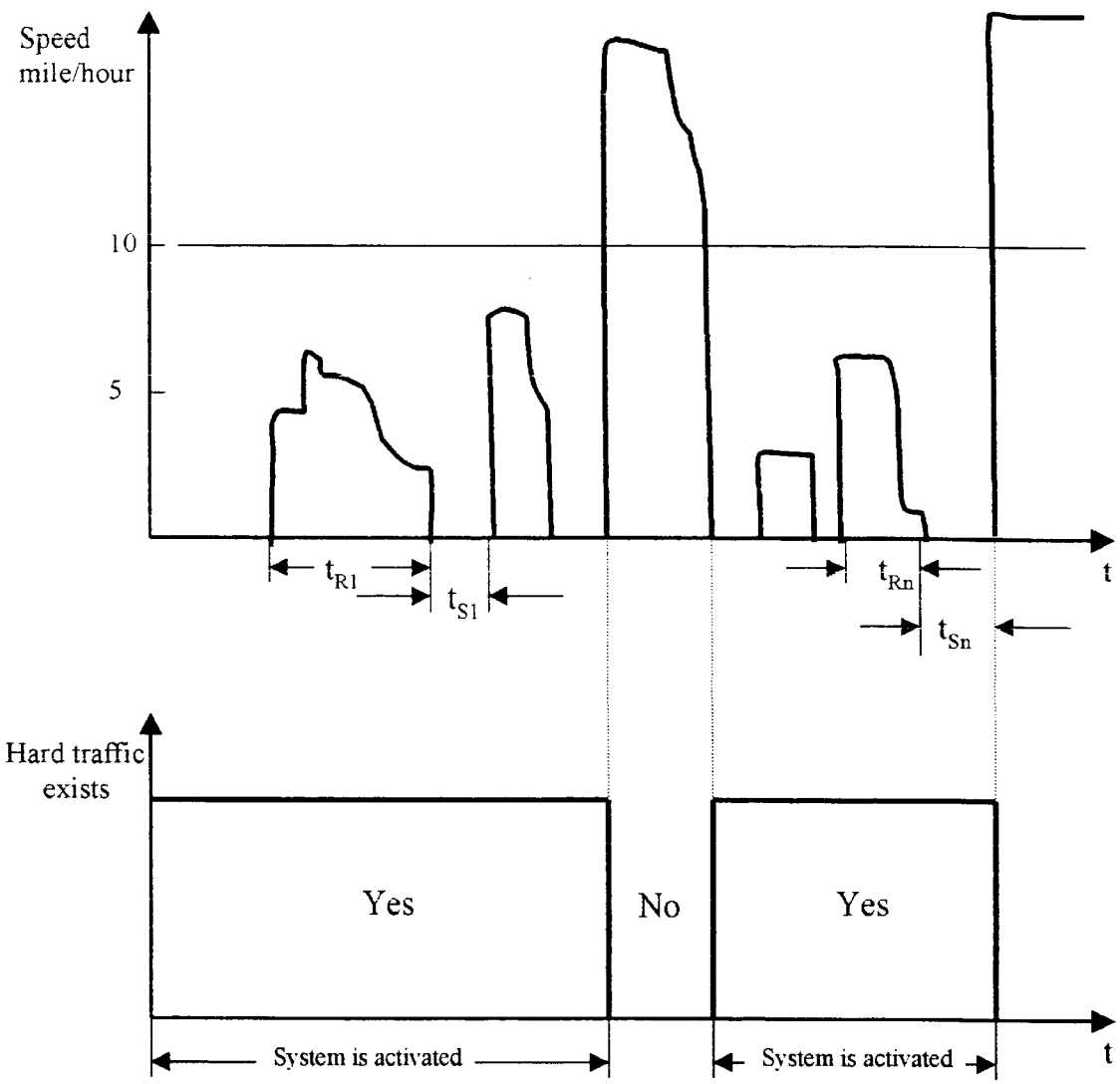
FIG. 16 is a hard traffic recognition procedure.

FIG. 16 shows a chart for the hard traffic recognition. The "hard traffic" condition of driving is a state in which the speed of the vehicle is not greater than 10 miles/per hour. In this case the driver can have a dialog with the system and pay enough attention for driving.

Figure 4:
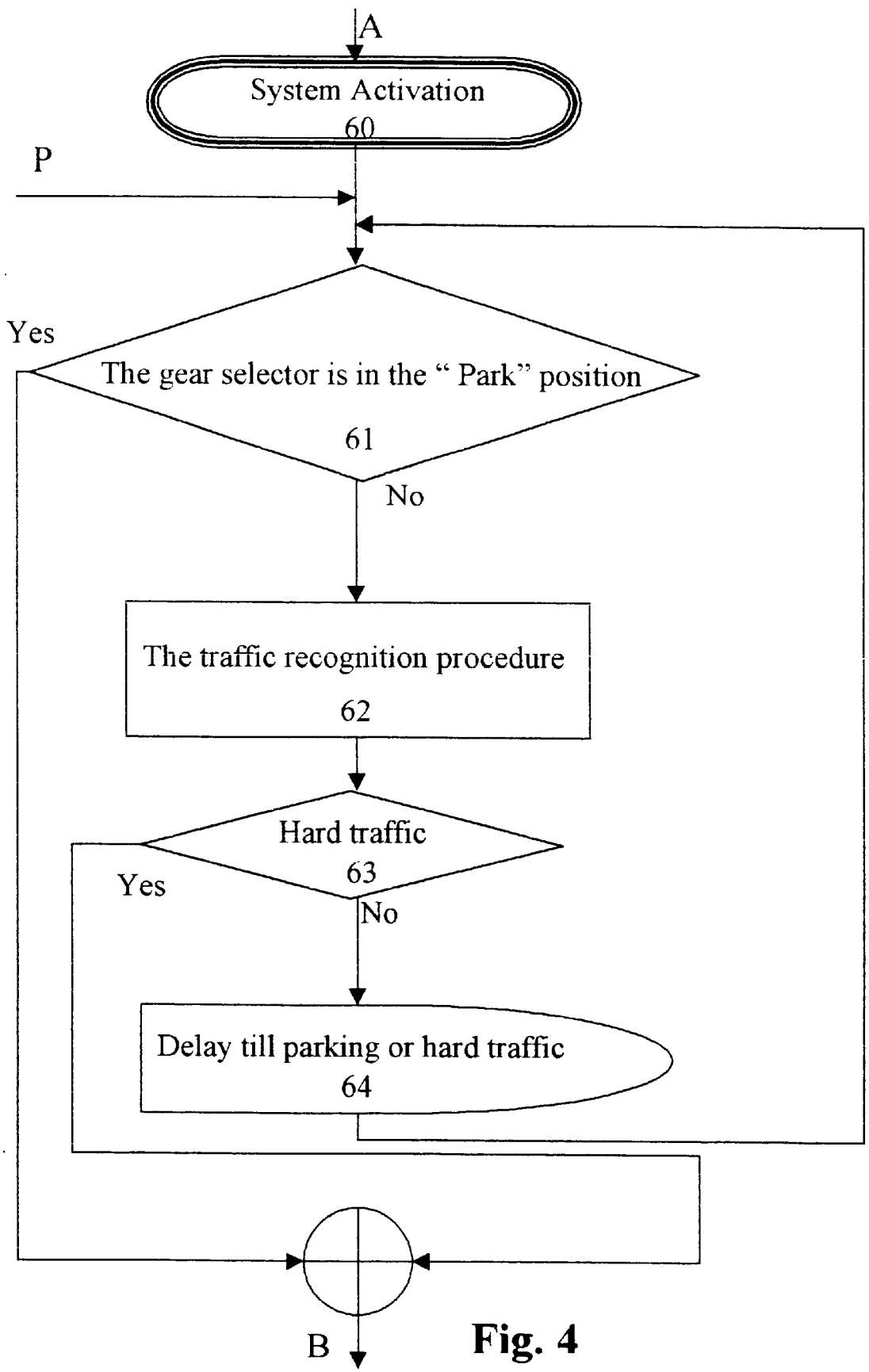
FIG. 4 is a flowchart for the System Activation routine.

The system is activated if the gear selector is in the "Park" position or speed of the vehicle is not more than 10 miles/per hour. FIG. 4 shows the System Activation routine 60 that checks the position of the gear selector 61 and, after the traffic recognition procedure 62, checks the hard traffic existence 63. If the gear selector is in the "Park" position or there is a hard traffic situation, the system is activated, and the driver may have a dialog with the system. If there is neither of the two states, the system remains passive, creates delay 64 until the parking or hard traffic situation occurs.

Figure 15:
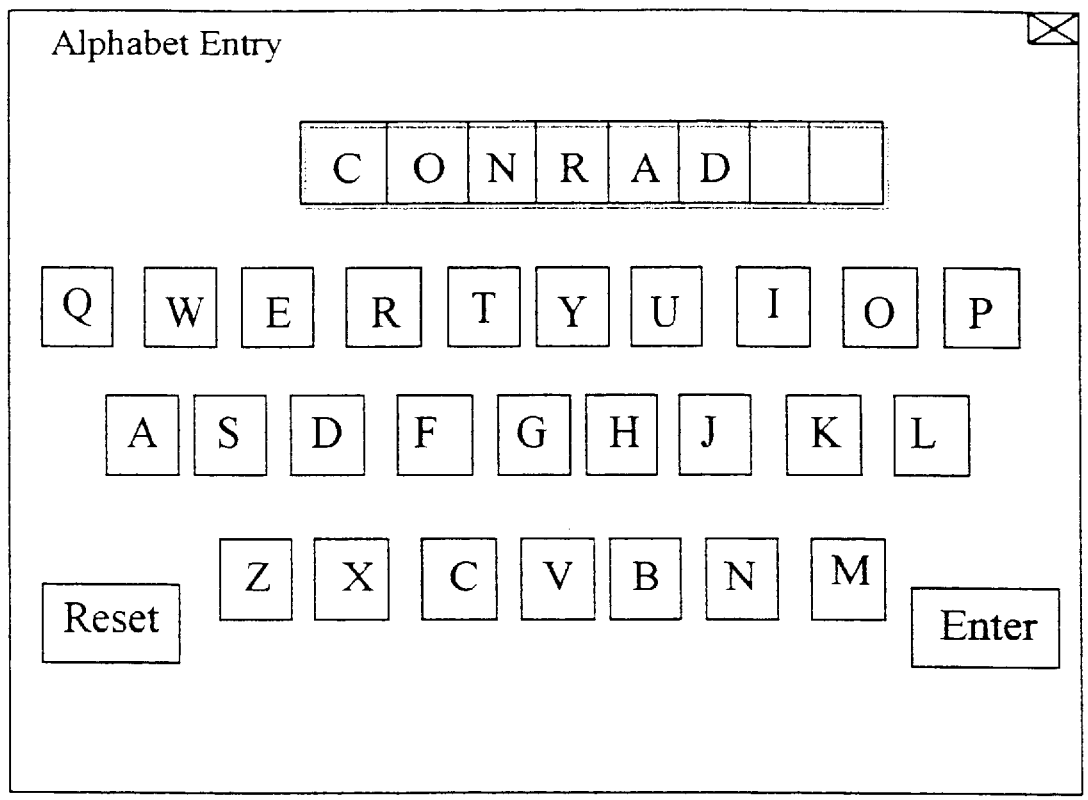
FIG. 15 is a display of the Alphabet Entry pop-up window.
Figure 17:
FIG. 17 is a "Welcome to Inkeep" screen for the Choose Your Diet routine.
Figure 18:
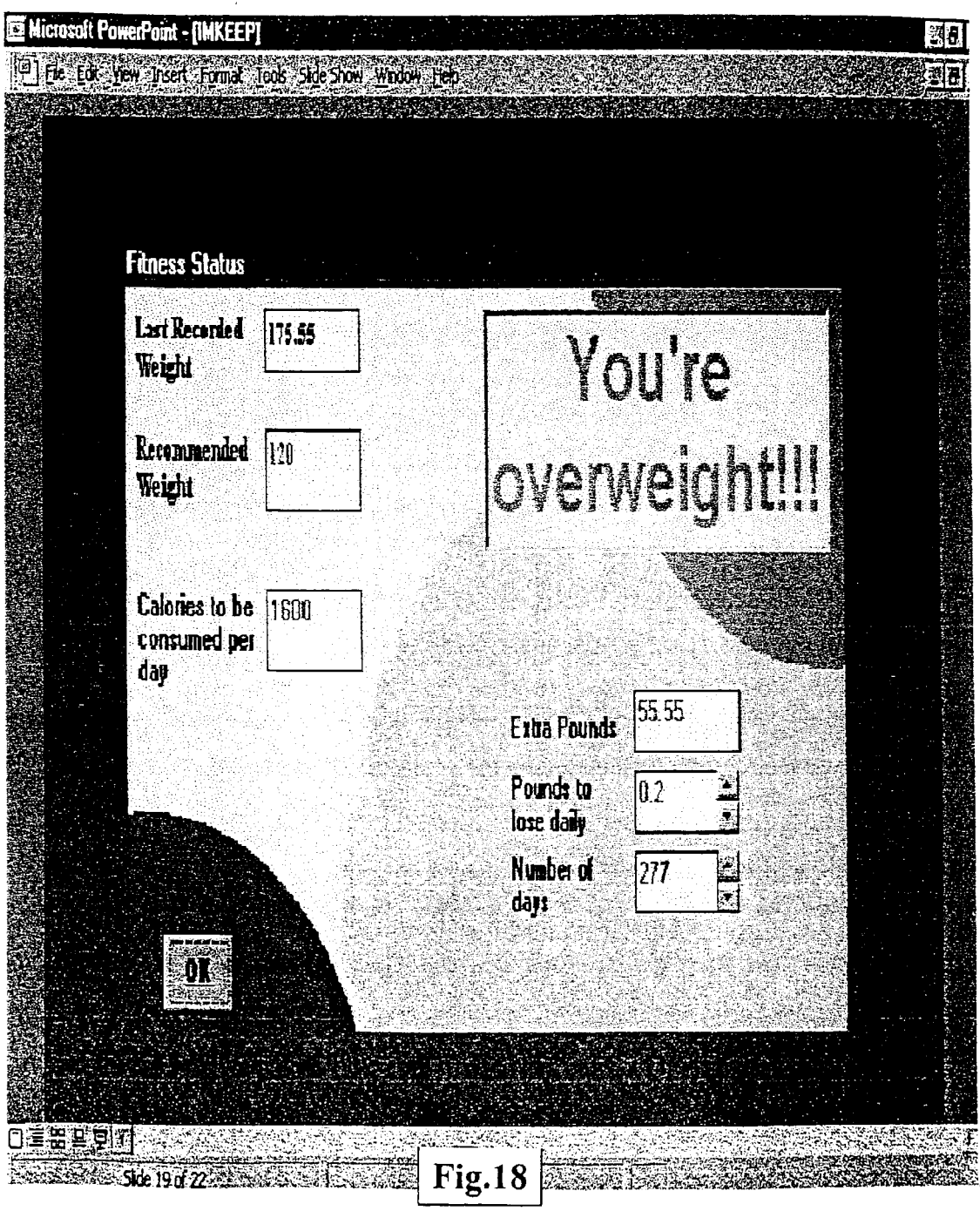
FIG. 18 is a "Fitness Status" screen for the Choose Your Diet routine.
Figure 19:
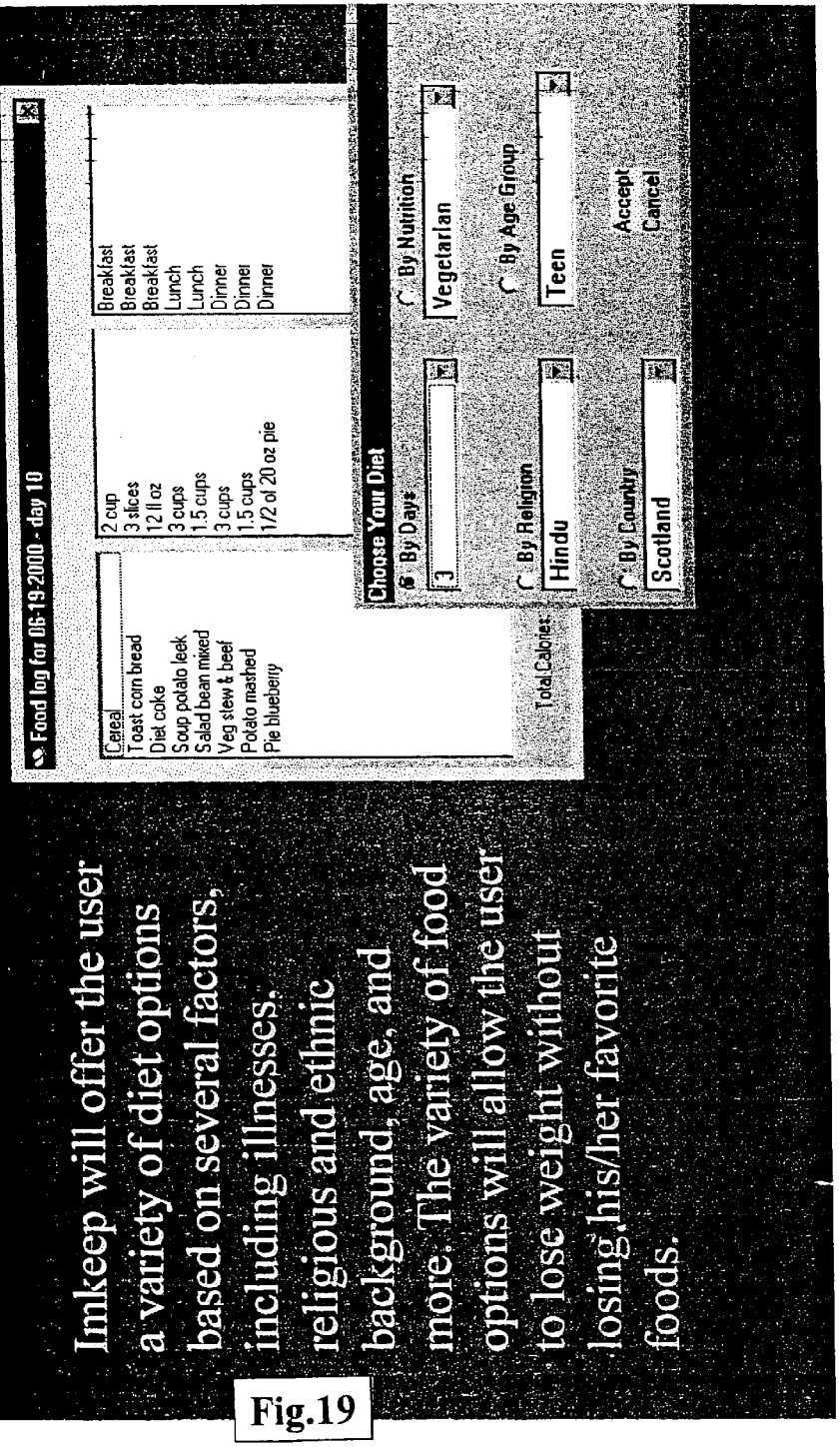
FIG. 19 is a "Choose Your Diet" screen for the Choose Your Diet routine and "Food log for MM-DD-YYYY" screen for Check Progress Graph routine.
Figure 20:
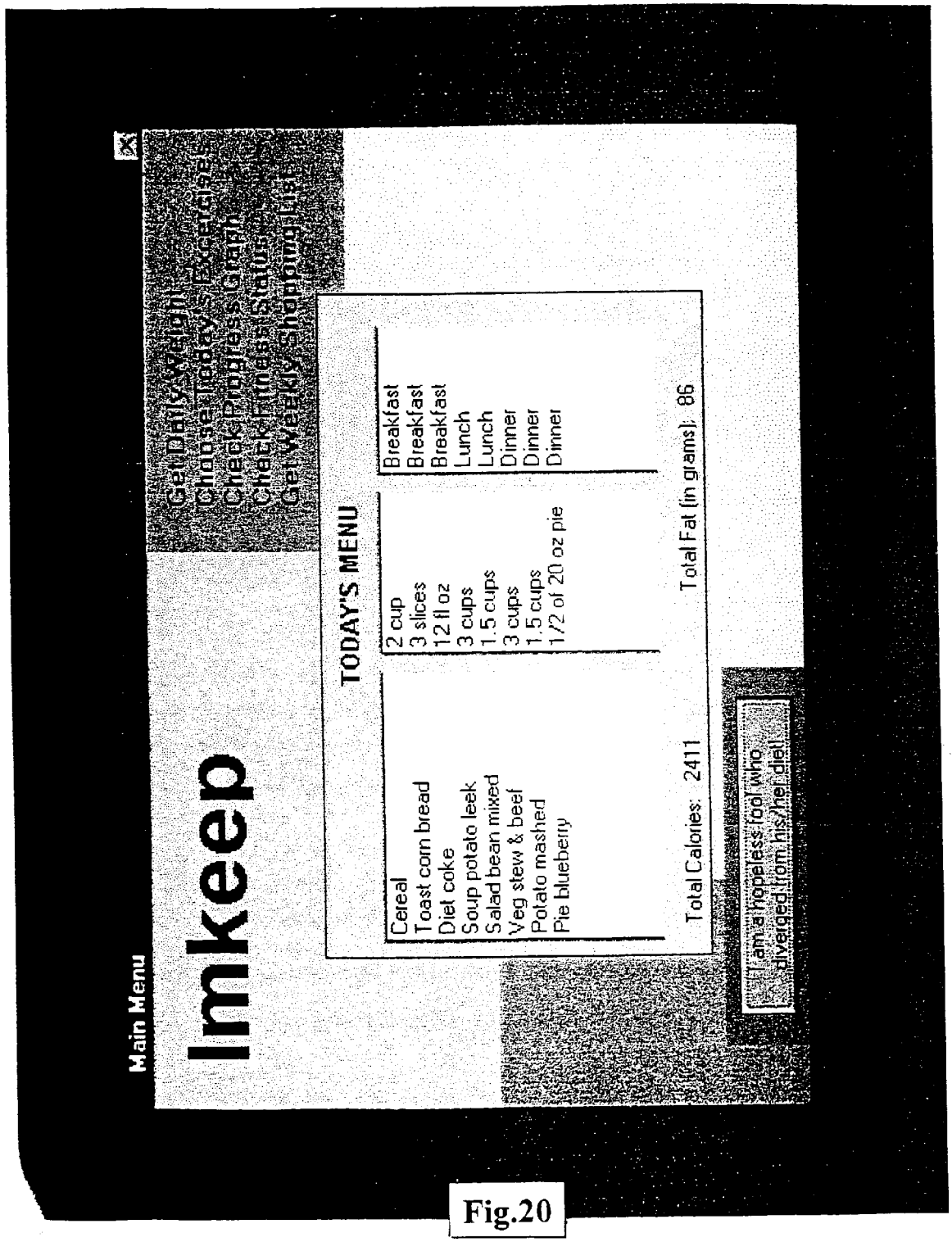
FIG. 20 is a Main screen.
Figure 21:
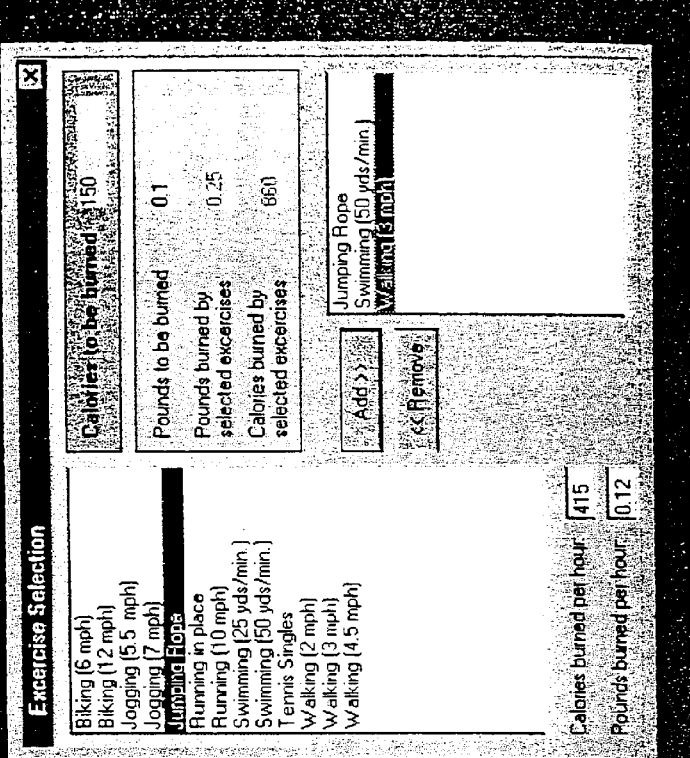
FIG. 21 is an "Exercise Selection" screen for the Choose Today's Exercise routine.
Figure 22:
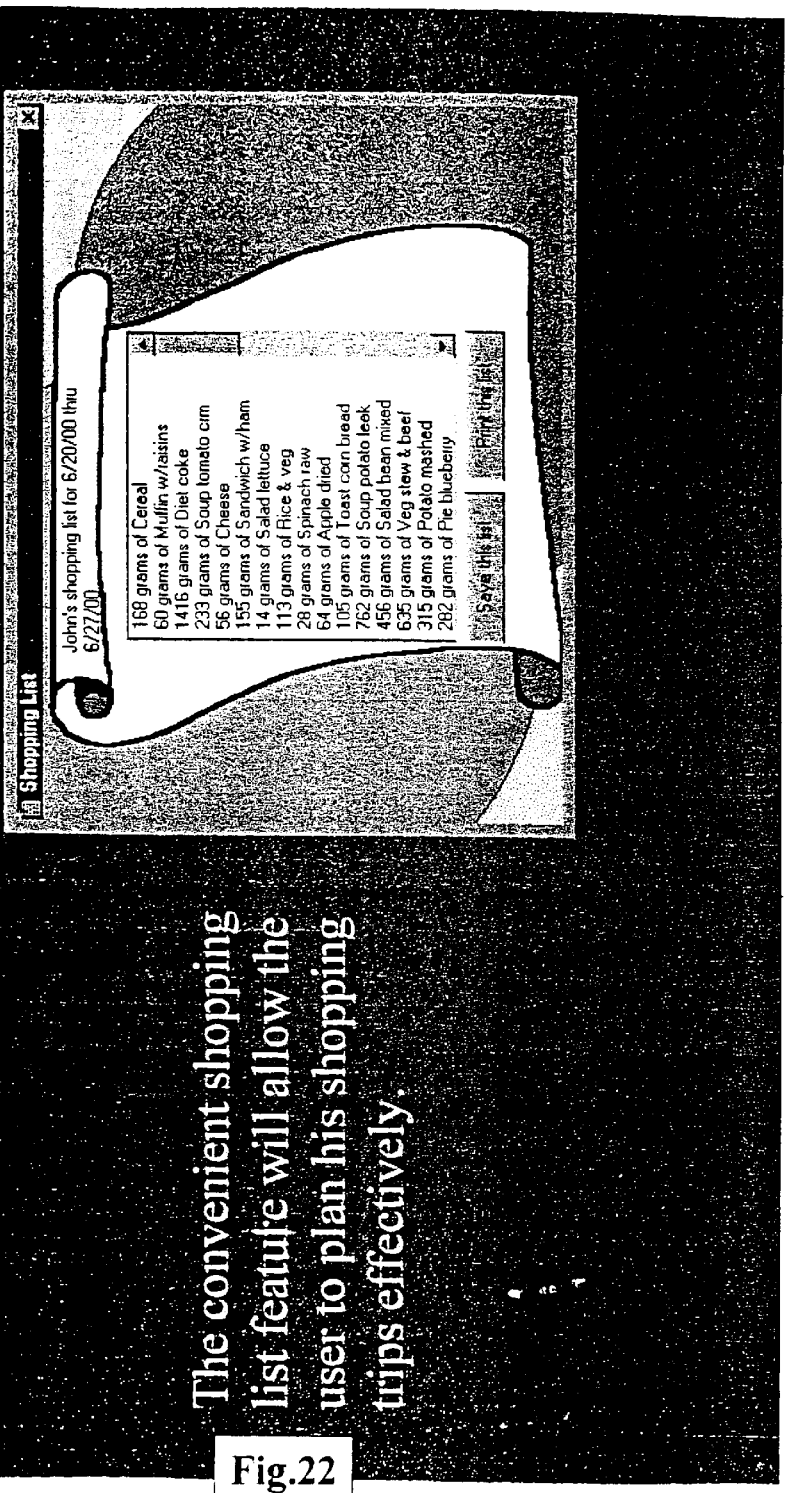
FIG. 22 is a "Shopping List" screen for the Shopping List routine.
Figure 23:
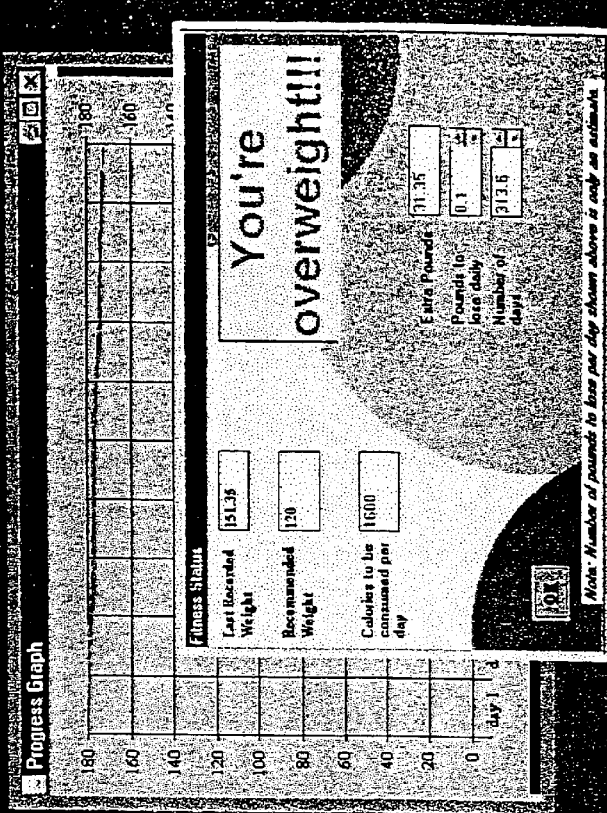
FIG. 23 is a "Progress Graph" screen for the Check Progress Graph routine and the "Fitness Status" screen for the Choose Your Diet routine.

When the system is activated, the screen "Welcome to Imkeep" (see this screen in FIG. 17). To make the description of the on-board vehicle weight progress control system more understandable, other screens of the system, named Imkeep, (Improve and Keep your Health in a Good Condition) are given in FIGS. 18 to 23). The "screens" provided herein are intended as examples only and in practice can be deviated from freely. Once the system is in operation and the introductory screen 71 appears through the Choose Your Diet routine 70 (FIG. 5), the dieter is invited to input his or her name and password 72 by use of the "Alphabet Entry" pop-up window (FIG. 15).

Figure 14:
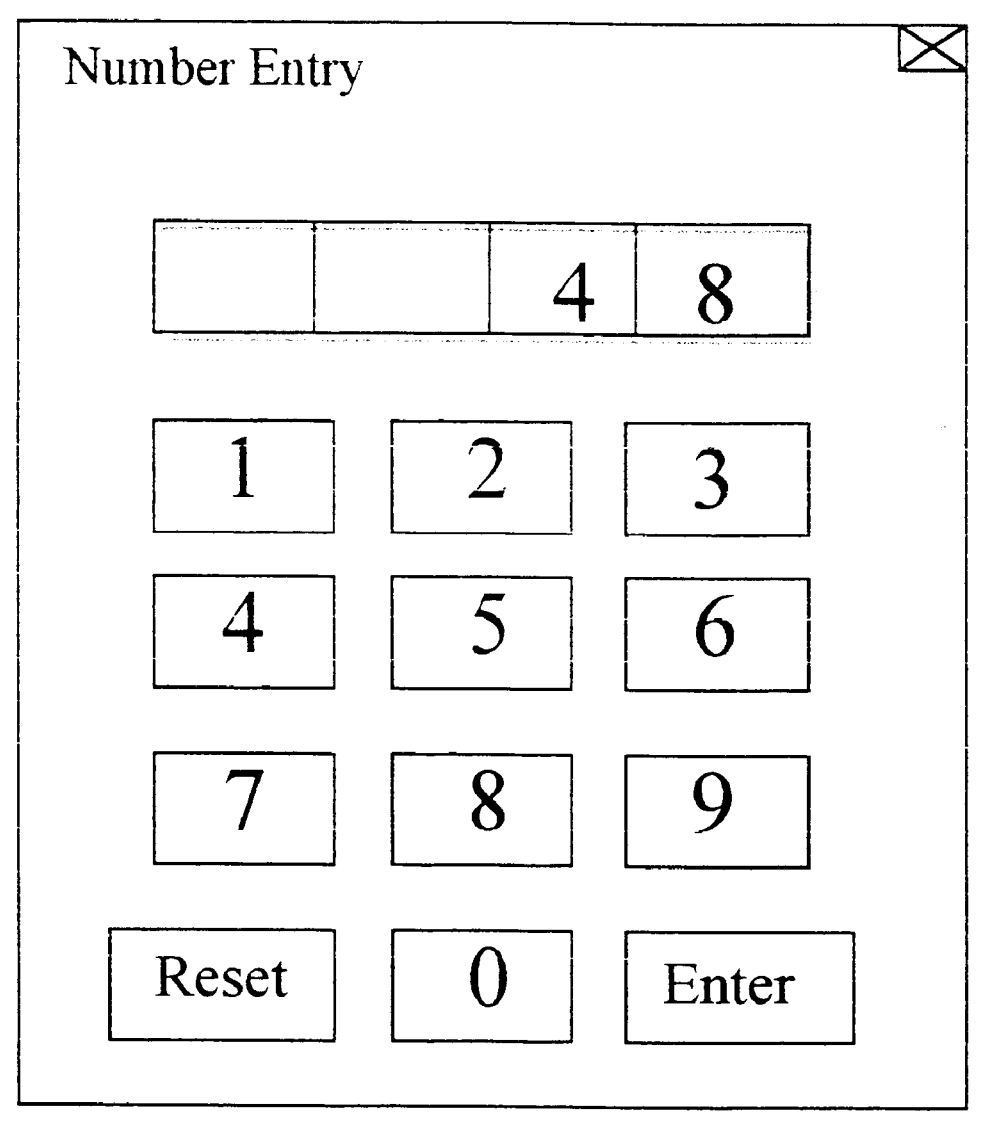

The system checks the name and password and realizes if the dieter is a new user 73. If the dieter is a new user, the system asks him or her to input 74 his or her age, sex, height, and physical type (H—a highly active individual, L—a limitedly active individual, S—a sedentary individual) by use of the "Alphabet Entry" window and "Number Entry" (FIG. 14) window.

After the dieter has inputted the above data the "Fitness Status" screen appears 75. It shows (see FIG. 18) recommended weight for the dieter by the doctors and calories to be consumed per day. The fitness status screen gives a warning if the dieter is overweight. The dieter can use the "Fitness Status" screen to choose the number of pounds to lose daily, and the dieter will find the number of the calculated days needed to lose extra pounds in the "day" box. Or the dieter can choose the number of days he or she wants to lose the extra pounds. In this case, the "Fitness Status" screen will show the calculated pounds to lose daily.

The system recommends to the dieter 76 to memorize the weight and daily calories that are recommended by the doctors to the user. The screen "Choose Your Diet" 77 appears (see FIG. 19). The system suggests to the dieter to choose a diet plan from a plurality of diets in the Diets Database according his or her weight, and daily calories, recommended by doctors or based upon dieter's taste, habits, physical type, etc.78.

Figure 8:
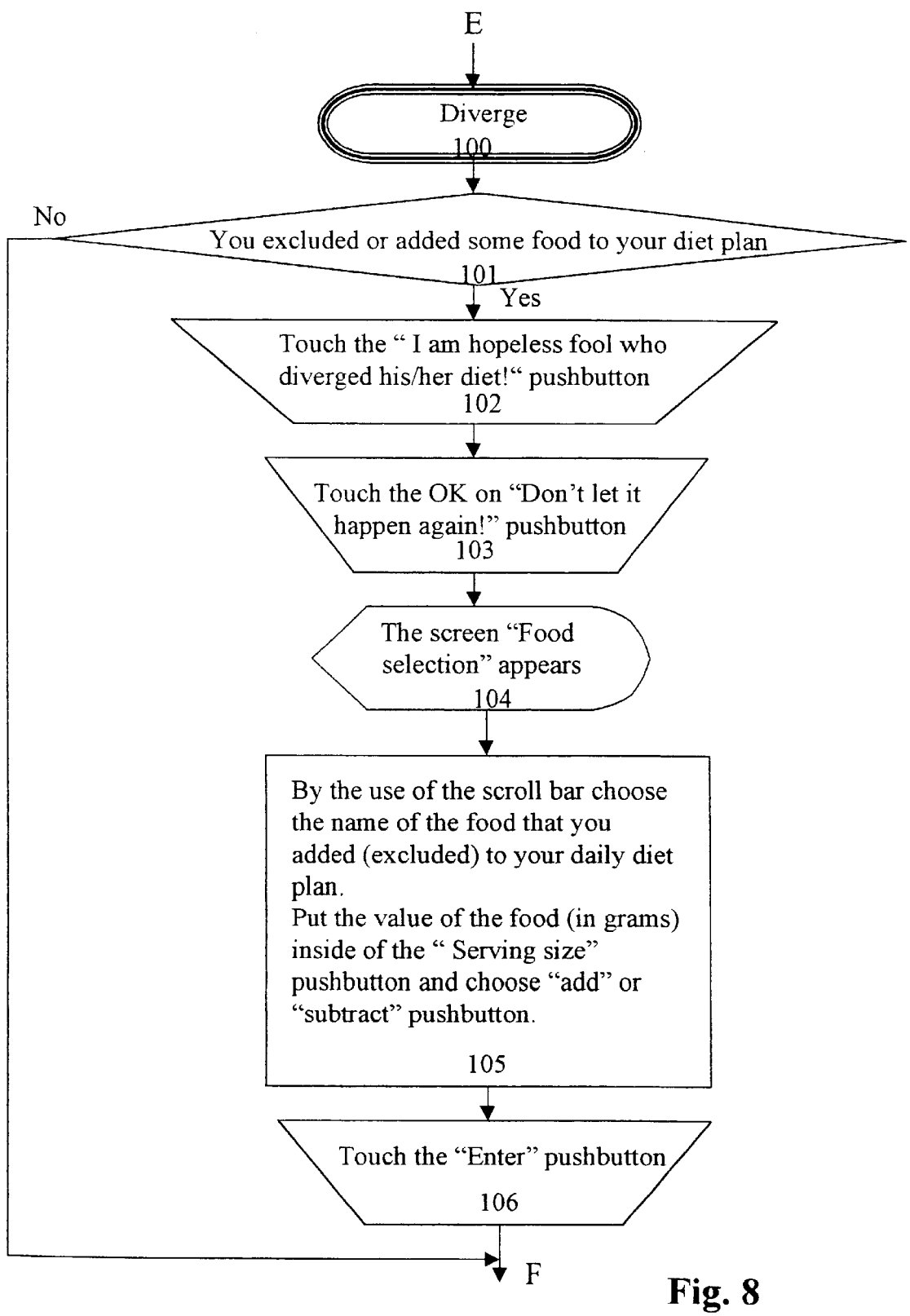
FIG. 8 is a flowchart for the Diverge routine.

The system then goes into the Clothing and Footwear routine 80 (FIG. 6) and asks the new dieter to give a clue about his or her clothing and footwear 81 by touching a corresponding item on the touch screen. If the dieter asked at 73 is not a new user, the system goes to the Weight Identifier routine 90 (FIG. 7) and realizes if the weight of the dieter has changed by one or more pounds since last measurement 91. If the weight has not changed by one or more pounds since the last measurement, the program goes directly to the Diverge routine 100. If the weight has changed, the system tries to find the reason of the change and asks the dieter if he or she changed clothing and/or footwear since the last weight measurement 92. If the answer is "yes", the system asks if the clothing has changed 93 or footwear 94. If clothing or footwear has changed, the program goes back to the Clothing and Footwear routine 80 where the dieter shows on the touch screen the items of the changed clothing or footwear. If the dieter answers in the Weight Identifier routine 90 that nothing has changed, the system gives a warning to the dieter that he or she has overeaten today and asks him or her to exercise more today 95 and the program goes to the Diverge routine 100 (FIG. 8).

The Diverge routine is used to find if dieter has changed during a current day something in his or her diet plan 101. If "yes", the system asks 102 the dieter-violator to touch "I am hopeless fool who diverged from his or her diet!" pushbutton on the main screen (see FIG. 20) and "OK" pushbutton on the warning "Don't let it happen again!" 103. The screen "Food selection" appears 104, and the dieter by use of the Food Database has to input to the Dieter's Database the items and value of the food he or she excluded or added to his or her current day diet plan 105, 106.

Figure 10:
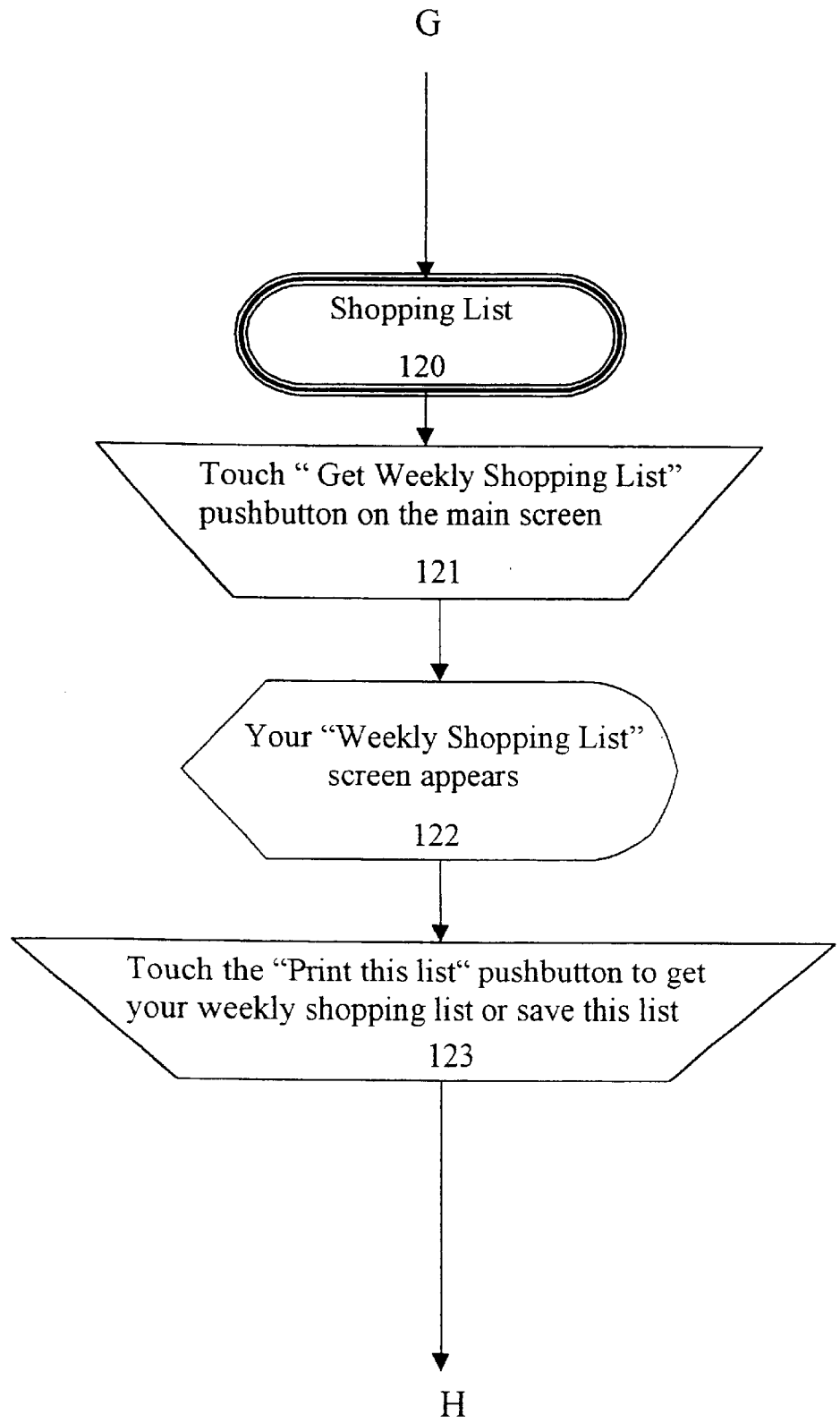
FIG. 10 is a flowchart for the Shopping List routine.

The dieter chooses everyday exercises by use of the Choose Today's Exercise routine 110 (FIG. 9) and Exercise Database. On the main screen (see FIG. 20) 111 he or she touches the "Choose Today's Exercises" pushbutton 112. On the screen "Exercise Selection" (see FIG. 21) that appears 113, according to his or her weight, and weight and daily calories, recommended by doctors, the dieter chooses his or her today's exercises by his or her taste, habits, physical type 114, 115. To get a weekly shopping list, the dieter uses the "Shopping List" routine 120 (FIG. 10). By touching the "Get Weekly Shopping List" pushbutton on the main screen 121, the dieter gets 122 the "Weekly Shopping List" screen (see FIG. 22). The dieter can check the food items and values and save this list or print it out 123.

Figure 11:
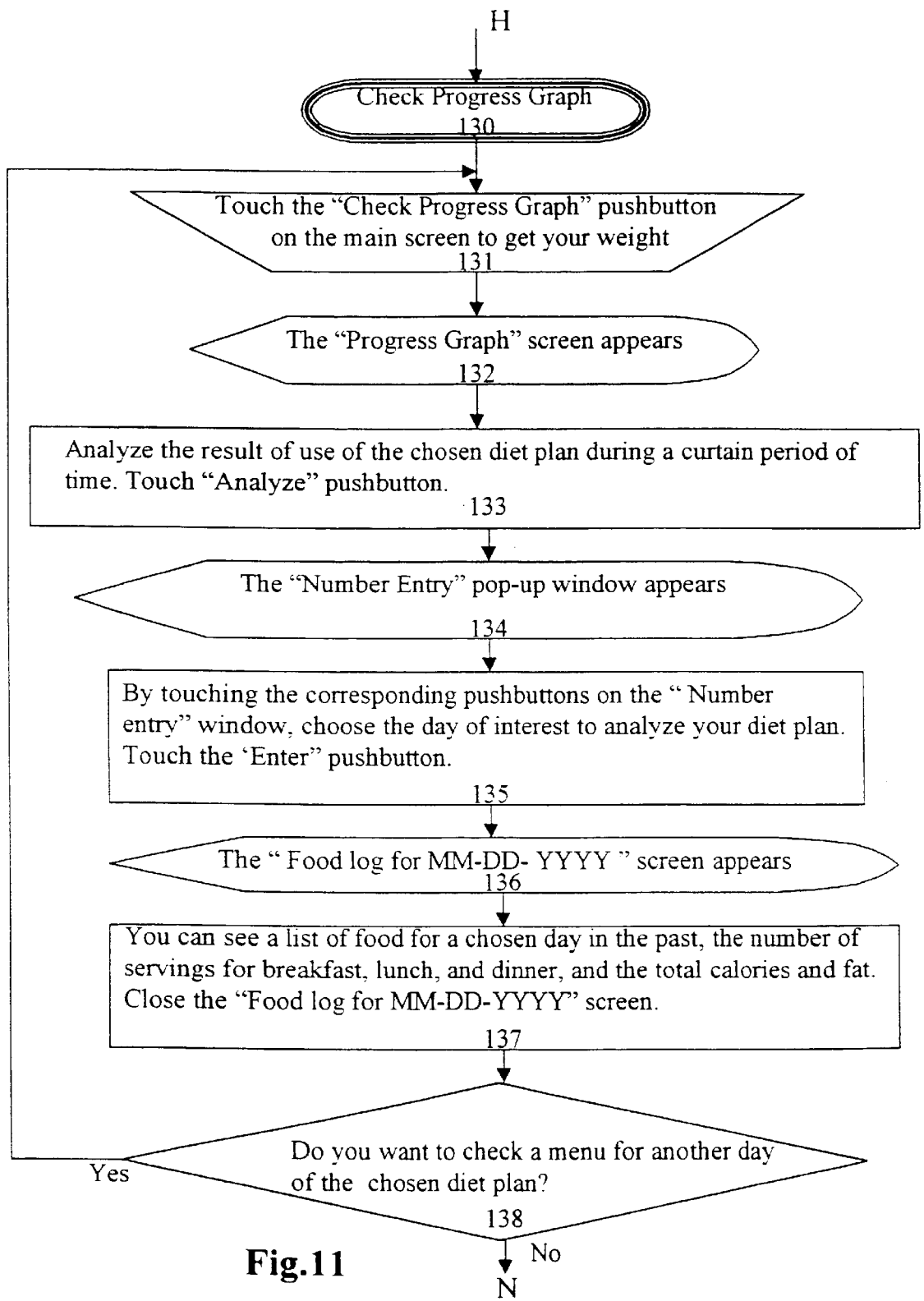
FIG. 11 is a flowchart for the Check Progress Graph routine.
Figure 12:
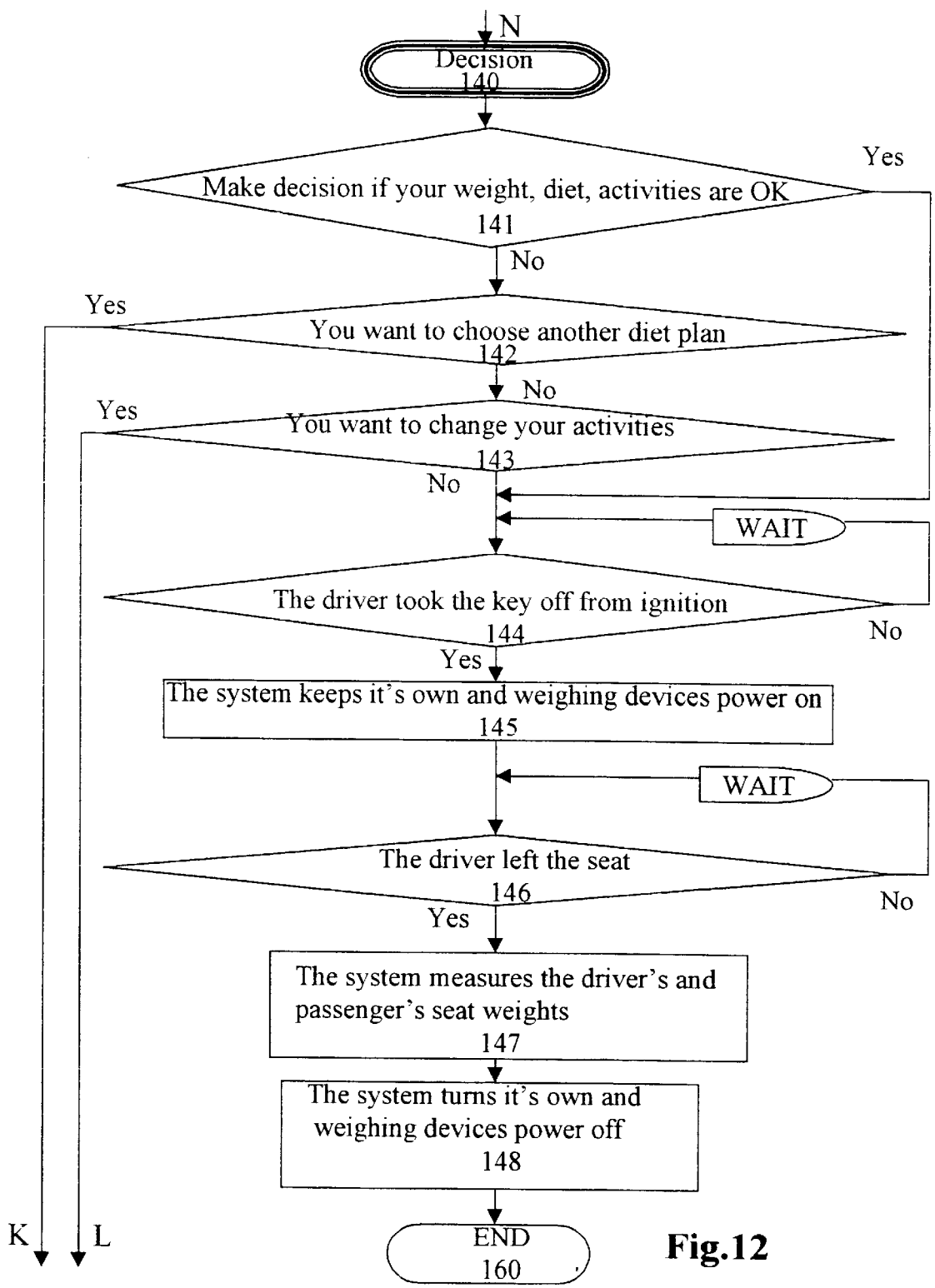
FIG. 12 is a flowchart for the Decision routine.

FIG. 11 shows the Check Progress Graph routine 130 by use of which the dieter can review his or her weight progress graph and see his or her menu on a selected day in the past of the chosen diet plan. This is useful for observing effect of a certain menu on the weight progress graph.

By touching 131 the "Check Progress Graph" pushbutton on the main screen (see FIG. 20) the dieter will get 132 the "Progress Graph" screen (see FIG. 23) with the dieter's weight progress graph on it. To observe the effect of a certain menu on the weight progress graph the dieter has to touch the "Analyze" pushbutton 133 and on the "Number Entry" pop-up window 134 choose the day of interest 135. The "Food log for the MM-DD-YYYY" screen (see FIG. 19) appears 136. The dieter can see a list of food items for a chosen day in the past and the effect on a weight progress graph, a number of servings for breakfast, lunch, and dinner, and the total calories and fat 137.

The dieter can check a menu for any day of his or her diet plan 138. The Decision routine 140 (FIG. 12) shows activities of the dieter when he or she wants to make a decision if his or her weight, diet, and exercises are satisfactory 141. If something is wrong, the dieter can choose another diet plan 142 and/or change exercises 143.

After a trip is accomplished and the driver has removed the key 144 from the ignition, the system keeps its own and the weighing devices power on 145. After the driver left his or her seat 146, the system measures the driver's and passenger's seat weights 147 and further turns it's own and the weighing device's power off 148.

Figure 13:
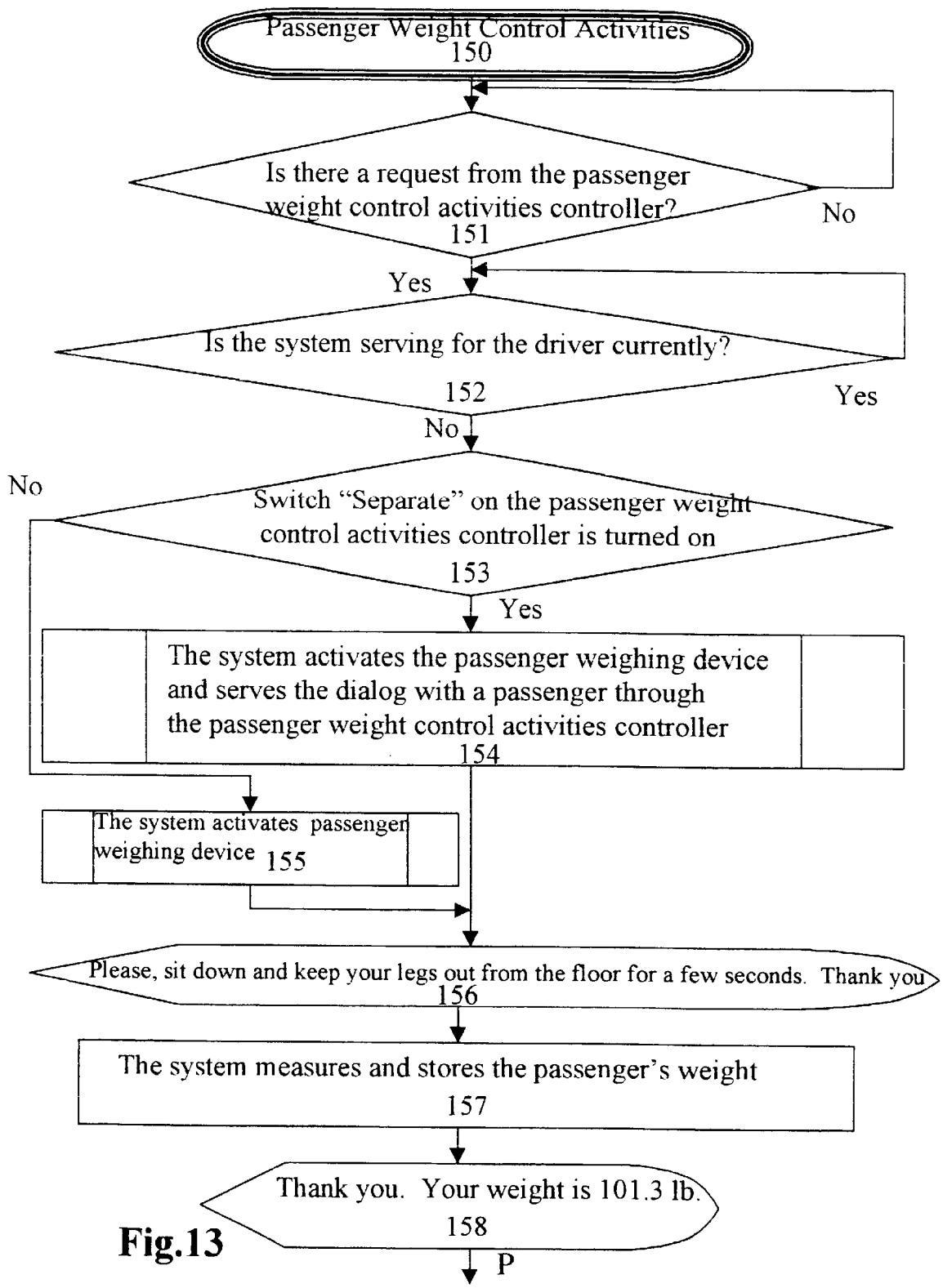
FIG. 13 is a flowchart for the Passenger Weight Control Activities routine.

The use of the on-board vehicle weight progress control system by the driver (named in description of FIG. 2 to FIG. 16 as user or dieter) is the same as by the passenger besides the System Initialization routine 50 (FIG. 3) and the Passenger Weight Control Activities routine 150 (FIG. 13).

A passenger starts his or her activities with the on-board vehicle weight progress control system by pushing an interrupt button on the dialog panel 32 of the passenger weight control activities controller 30 that activates interrupt line 33 of the passenger weight control activities controller 30. The on-board vehicle microcomputer 10 permanently monitors 151 an interrupt line of its interrupt controller 14. If the system is not busy (does not serve the driver) 152, it checks 153 a position of the switch "Separate" of the passenger weight control activates controller 30. If this switch is turned on, the system activates 154 the passenger weighing device 22 and serves the dialog with the passenger through the passenger weight control activities controller 30. If the switch is turned off, the system activates 155 the passenger weighing device 22, but dialog between the dieter and system will go through the touch screen of the on-board vehicle microcomputer display. In this case the touch screen of the passenger weight control activities controller will be passive. The system invites 156 the passenger to sit down on the microcomputer controlled passenger weighing device 22. The system measures and stores the passenger's weight 157 and shows on the touch screen of the on-board vehicle microcomputer display 13 the passenger's weight 158. If the system in 152 serves for the driver's program, it continue to do it until it is accomplished and serve for the driver's program. The use of the on-board vehicle weight progress identifying and control system by the passenger through routines 60, 70, 80, 90, 100, 110, 120, 130, 140, and 160 is the same as for the driver.

As has been suggested by FIG. 1, the driver and the passenger (or each passenger) can have respective touch screen display/input units which can be located on the dashboard, vehicle ceiling or elsewhere and positioned so that only the individual involved with use of the unit at the particular moment can see the screen which is in use. The touch screen display can also be provided on a seat structure.

I claim:

1. A motor vehicle comprising:
   an on-board vehicle microcomputer having a central processing unit, a memory, a touch-screen display and programmed to provide method of identifying and control of a weight progress of dieter selected from a driver-dieter and at least one passenger-dieter in said vehicle; and
   an on-board weighing device for monitoring weight progress of said dieter in said vehicle, said microcomputer having:
   a system initialization routine responsive to accessing of said vehicle by a vehicle operator;
   a traffic recognition routine for determining whether the vehicle is in a safe state for monitoring weight control;
   a weight identifier routine for identifying a reason for any changes in weight of a dieter since a prior identification;
   a clothing and footwear routine for identifying changes in clothing and footwear worn by a dieter since a prior identification;
   a diet choice routine enabling said dieter to choose a diet plan from a plurality of diet plans stored in said memory;
   a diverge routine responsive to inputs from said touch screen display for enabling said dieter to register deviations from a planned diet;
   an exercise routine for suggesting and choosing exercises suitable for the dieter and a selected diet plan;
   a progress checking routine for comparing results of successive weighings of the dieter with expected results of a selected diet plan; and
   a plurality of routines for generating menus and exercise suggestions for said dieters in accordance with a weight of the dieter, a selected diet plan and a selected exercise plan.

2. The motor vehicle defined in claim 1 wherein said system initialization routine is responsive to operation of a keyless terminal of the vehicle and starting of an engine of said vehicle, automatically weighs a driver's seat of the vehicle without a driver and then weighs the seat with a driver seated in it to supply a weight of the driver to said microcomputer.

3. The motor vehicle defined in claim 1 wherein said traffic recognition routine distinguishes between a safe-operation state wherein a gear-shift lever of said vehicle is in park or said vehicle is operated below a certain speed and in which weight control is monitored and another state wherein said gear-shift lever is not in park and said vehicle is operated above said certain speed and weight control monitoring is postponed.

4. The motor vehicle defined in claim 1 wherein said weight identifier routine determines a weight change from a previous measurement exceeding a certain magnitude, ascertains whether there has been a change in clothing or footwear by the dieter since the previous measurement, and signals the dieter to alert the individual to overeating.

5. The motor vehicle defined in claim 1 wherein said clothing and footwear routine dialogs with said dieter to ascertain particular changes in clothing and footwear worn by the dieter since a previous measurement and calculates a difference in weight attributable to altered clothing.

6. The motor vehicle defined in claim 1 wherein said diet choice routine identifies the dieter as a particular user, dialogs with the dieter as to physical traits of the dieter, generates a physical status screen for said dieter, displays a diet choice screen and responds to a diet choice selection by the dieter on said diet choice screen.

7. The motor vehicle defined in claim 1 wherein said diverge routine determines whether said dieter has deviated from a previous diet plan assigned to said dieter, enters details of divergence from said previous diet plan and dialogs with the dieter as to the effect of divergence from the prior diet plan.

8. The motor vehicle defined in claim 1 wherein said exercise routine displays an exercise selection screen with exercise choices, enables an exercise selection to be made on said exercise selection screen, and correlates exercise selections with weight and daily caloric intake and the dieter's taste, habits and physical type.

9. The motor vehicle defined in claim 1 wherein said progress checking routine displays upon a request a weight progress graph of the dieter, displays results projected on use of selected diet plans for the dieter and provides food lists for different days based upon diet plan analysis.

10. The motor vehicle defined in claim 1, further comprising means for providing a separate input enabling, upon completion of at least certain of said routines by a driver constituting said dieters, at least one passenger to monitor his or her weight in the vehicle.

11. The motor vehicle defined in claim 1 wherein:
    said traffic recognition routine distinguishes between a safe-operation state wherein a gear-shift lever of said vehicle is in park or said vehicle is operated below a certain speed and in which weight control is monitored and another state wherein said gear-shift lever is not in park and said vehicle is operated above said certain speed and weight control monitoring is postponed;
    said weight identifier routine determines a weight change from a previous measurement exceeding a certain magnitude, ascertains whether there has been a change in clothing or footwear by the dieter since the previous measurement, and signals the dieter to alert the dieter to overeating;
    said clothing and footwear routine dialogs with said individual to ascertain particular changes in clothing and foot-wear worn by the dieter since a previous measurement and calculates a difference in weight attributable to altered clothing;
    said diet choice routine identifies the dieter as a particular user, dialogs with the dieter as to physical traits of the dieter, generates a physical status screen for said dieter, displays a diet choice screen and responds to a diet choice selection by the dieter on said diet choice screen;
    said diverge routine determines whether said dieter has deviated from a previous diet plan assigned to said dieter, enters details of divergence from said previous diet plan and dialogs with the dieter as to the effect of divergence from the prior diet plan;
    said exercise routine displays a main screen with exercise choices, enables an exercise selection to be made on said main screen, and correlates exercise selections with weight and daily caloric intake and the dieter's taste, habits and physical type;
    said progress checking routine displays upon a request a weight progress graph of the dieter, displays results projected on use of selected diet plans for the dieter and provides food lists for different days based upon diet plan analysis; and a separate input is provided enabling, upon completion of at least certain of said routines by a driver constituting said dieter, at least one passenger to monitor his or her weight in the vehicle.

12. A motor vehicle comprising:

an on-board vehicle microcomputer having a central processing unit, a memory, a touch-screen display and programmed to provide method of identifying and control of a weight progress of dieter selected from a driver-dieter and at least one passenger-dieter in said vehicle;

an on-board weighing device for monitoring weight progress of said dieter in said vehicle;

a dieter's weight control system initialization device receiving an initialization signal from the vehicle keyless terminal;

a weight identifying device providing an indication of the dieter's weight progress measurement independently of seasonal changes of clothing and/or footwear; and a dieter's weight control activities controller providing dialog of said microcomputer with said dieter.

13. A method of operating an automotive vehicle having an on-board vehicle microcomputer with a central processing unit, a memory and a display, a means responsive to weight of at least one individual in said vehicle, said method comprising the steps of:

(a) programming said microcomputer with information as to a multiplicity of diets and exercise regimen suitable for a variety of different dieters;

(b) weighing an individual in said vehicle and registering the weighed individual's weight with said microcomputer;

(c) displaying diet and exercise information for the weighed individual based upon stored information in the microcomputer;

(d) displaying weight progress resulting from dieting for said individual in said vehicle upon the issuance of an instruction by said individual to said microcomputer; and (e) disabling said microcomputer from responding to the weight of said individual under certain driving conditions of said vehicle.

14. The method defined in claim 13 wherein said microcomputer is programmed to identify different individuals utilizing said vehicle and includes means for registering weight progress information for each of said individuals.

15. The method defined in claim 14, further comprising the step of registering instructions in said microcomputer issued by at least one of said individuals in the form of voiced instructions and issuing an output to an individual in said vehicle in the form of a voiced output.

16. A motor vehicle comprising:

an on-board vehicle microcomputer having a central processing unit, a memory, a touch-screen display and programmed to provide method of identifying and control of a weight progress of dieter selected from a driver-dieter and at least one passenger-dieter in said vehicle;

an on-board weighing device for monitoring weight progress of said dieter in said vehicle;

a driver weight control system initialization device receiving a initialization signal from the vehicle keyless terminal;

a weight identifying device providing an independence of said dieter's weight progress measurement from seasonal changes of clothing and/or footwear; and a passenger weight control activities controller providing dialog of said microcomputer with said passenger-dieter.

* * * * *

UNITED STATES PATENT AND TRADEMARK OFFICE
CERTIFICATE OF CORRECTION

PATENT NO. : 6,649,848 B2
DATED : November 18, 2003
INVENTOR(S) : Yefim G. Kriger It is certified that error appears in the above-identified patent and that said Letters Patent is hereby corrected as shown below:

<u>Title page,</u>
Item [54], Title should read -- [54]   VEHICLE WITH ON-BOARD DIETERS WEIGHT PROGRESS IDENTIFYING AND CONTROL SYSTEM AND METHOD --

<u>Column 1,</u>
Line 2, for "INDENTIFYING" read -- IDENTIFYING --.

Signed and Sealed this

Twenty-fifth Day of May, 2004

JON W. DUDAS
*Acting Director of the United States Patent and Trademark Office*